US012156230B2

(12) United States Patent
Takahashi et al.

(10) Patent No.: US 12,156,230 B2
(45) Date of Patent: Nov. 26, 2024

(54) BASE STATION APPARATUS, TERMINAL APPARATUS AND COMMUNICATION METHOD FOR REPETITIVE TRANSMISSION OF PUSCH

(71) Applicants: SHARP KABUSHIKI KAISHA, Sakai (JP); FG Innovation Company Limited, Tuen Mun (HK)

(72) Inventors: Hiroki Takahashi, Sakai (JP); Shohei Yamada, Sakai (JP); Masayuki Hoshino, Sakai (JP); Hidekazu Tsuboi, Sakai (JP); Liqing Liu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 325 days.

(21) Appl. No.: 17/599,720

(22) PCT Filed: Mar. 23, 2020

(86) PCT No.: PCT/JP2020/012804
§ 371 (c)(1),
(2) Date: Sep. 29, 2021

(87) PCT Pub. No.: WO2020/203427
PCT Pub. Date: Oct. 8, 2020

(65) Prior Publication Data

US 2022/0086896 A1 Mar. 17, 2022

(30) Foreign Application Priority Data

Mar. 29, 2019 (JP) ................................ 2019-067641

(51) Int. Cl.
*H04W 72/23* (2023.01)
*H04W 72/0446* (2023.01)
(Continued)

(52) U.S. Cl.
CPC ....... *H04W 72/23* (2023.01); *H04W 72/0446* (2013.01); *H04W 72/1268* (2013.01); *H04W 76/20* (2018.02)

(58) Field of Classification Search
None
See application file for complete search history.

(56) References Cited

U.S. PATENT DOCUMENTS

2019/0044646 A1* 2/2019 Xu .......................... H04L 27/36
2019/0053211 A1 2/2019 Ying et al.
(Continued)

FOREIGN PATENT DOCUMENTS

JP 2017506440 A 3/2017
WO 2018/175596 9/2018
WO 2019050381 A1 3/2019

OTHER PUBLICATIONS

NTT DOCOMO, Revision of SI: Study on New Radio Access Technology, 3GPP TSG RAN Meeting #72, Busan, Korea, Jun. 13-16, 2016, RP-161214.
(Continued)

*Primary Examiner* — Diane L Lo
(74) *Attorney, Agent, or Firm* — ScienBiziP, P.C.

(57) ABSTRACT

A terminal apparatus is provided. The terminal apparatus includes: a reception unit configured to receive (i) a radio resource control (RRC) message including first configuration information and (ii) downlink control information including a first field via a physical downlink control channel (PDCCH); and a transmission unit configured to perform one or more repetitive transmissions of a physical uplink shared channel (PUSCH) based on the first configuration information and the first field. The first configuration information is for configuring at least one of a starting symbol of a time resource corresponding to an index indicated by the first field, a number of symbols allocated to one PUSCH
(Continued)

PDSCH (A) PDSCH mapping type A

S

First DMRS symbol L 1 slot (B) PDSCH mapping type B

S

First DMRS symbol L 1 slot corresponding to the index, and a nominal number of repetitive transmissions corresponding to the index.

3 Claims, 24 Drawing Sheets

(51) Int. Cl.
*H04W 72/1268* (2023.01)
*H04W 76/20* (2018.01)

(56) References Cited

U.S. PATENT DOCUMENTS

2021/0184819 A1* 6/2021 Takeda .................. H04W 24/10
2021/0314982 A1* 10/2021 Panteleev ............. H04L 5/0053
2022/0150003 A1* 5/2022 Takeda .................. H04L 1/1896
2022/0191081 A1* 6/2022 Kim ...................... H04L 5/0094
2022/0210697 A1* 6/2022 Andersson ............ H04L 5/0091
2022/0346093 A1 10/2022 Choi et al.

OTHER PUBLICATIONS

Nokia, Nokia Shanghai Bell, "Summary of Friday offline discussion on potential enhancements for PUSCH for NR URLLC (AI 7.2.6.1.3)", R1-1903797, 3GPP TSG-RAN WG1 Meeting #96, Athens, Greece, Feb. 25-Mar. 1, 2019.

* cited by examiner

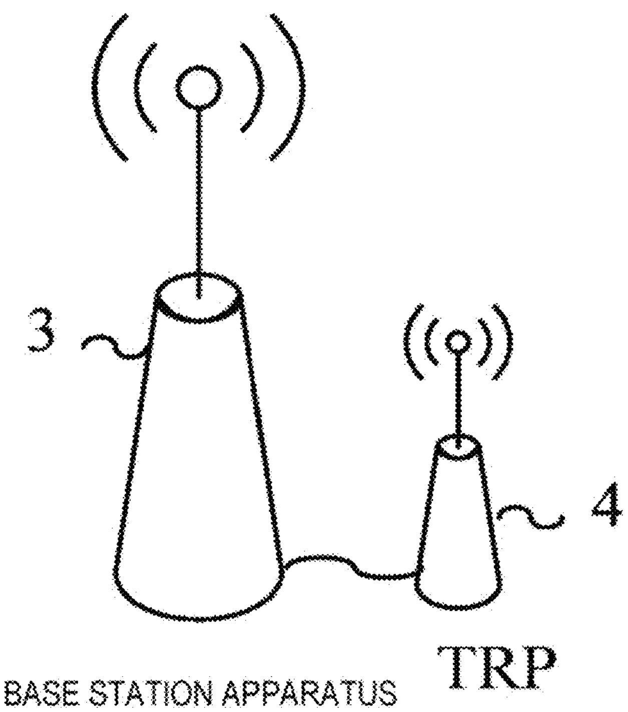
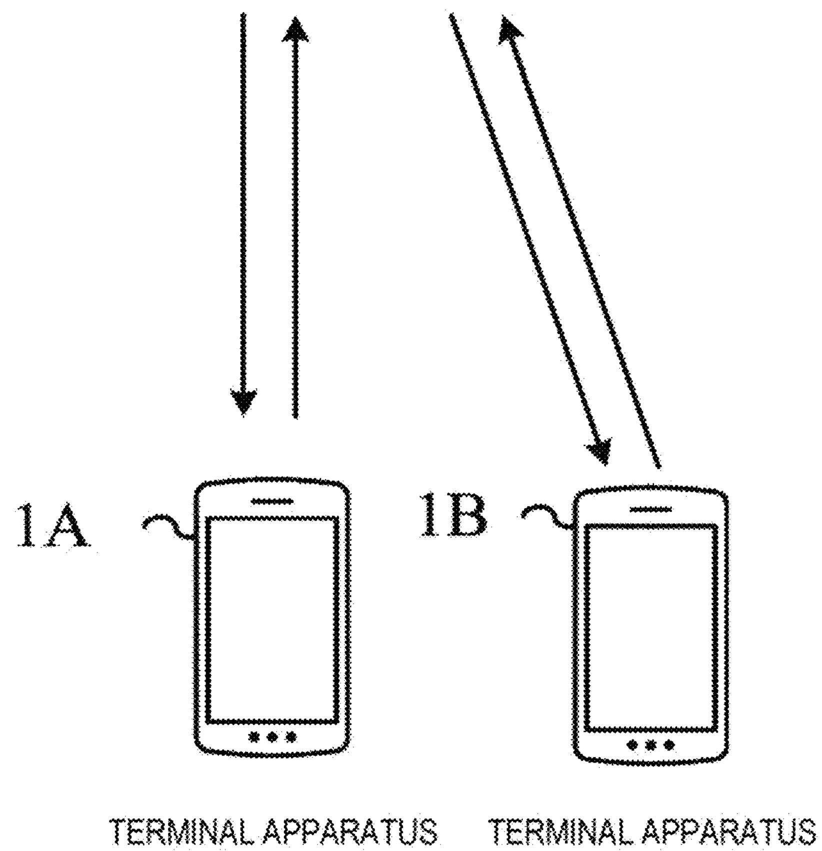
FIG. 1

PDSCH
(A) PDSCH mapping type A
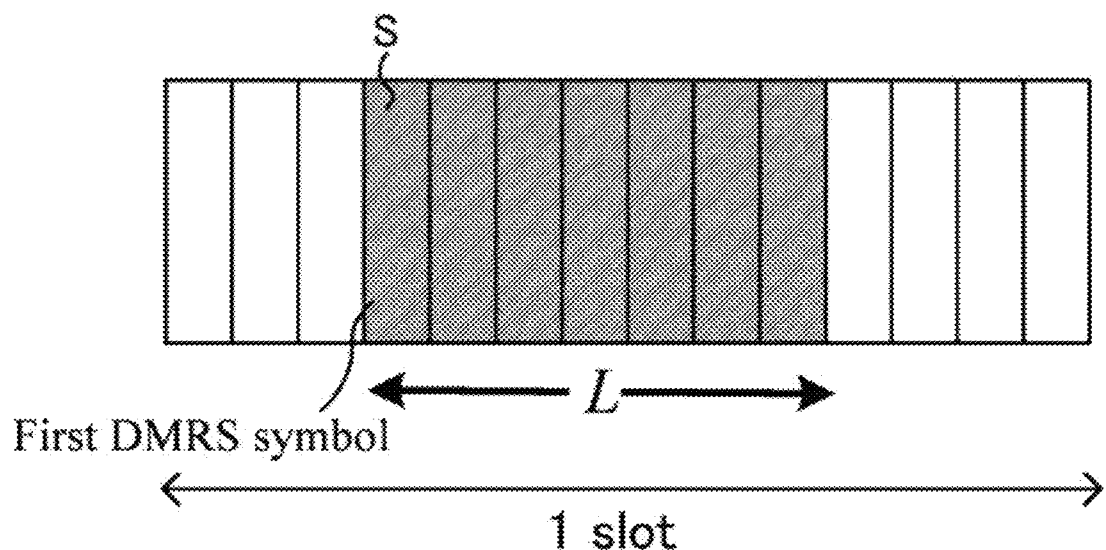
(B) PDSCH mapping type B
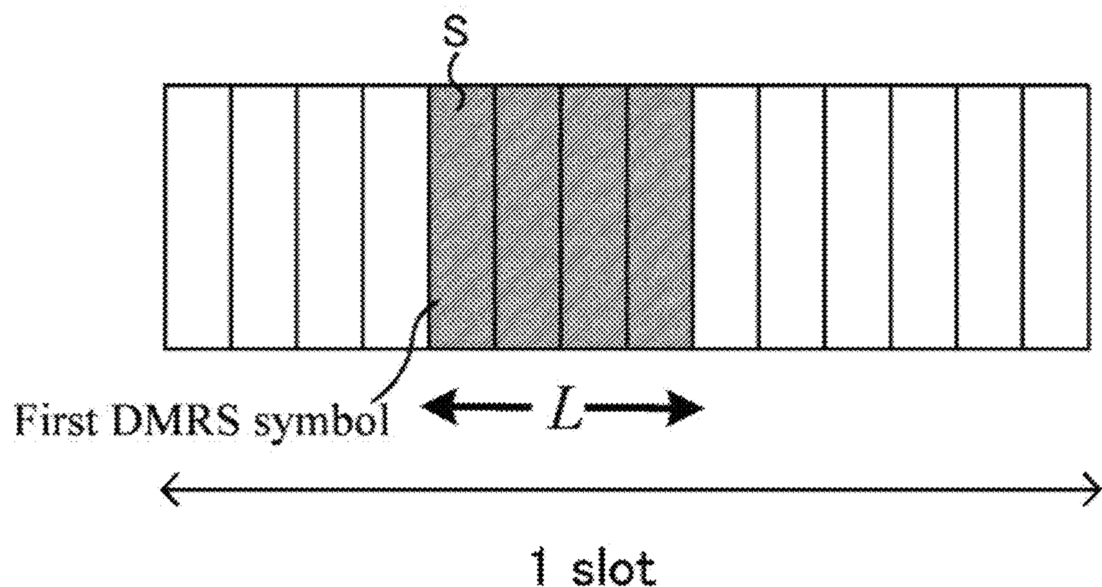
FIG. 7

Applicable PDSCH time domain resource allocation

| **RNTI** | **PDCCH search space** | **SS/PBCH block and CORESET multiplexing pattern** | ***pdsch-ConfigCommon* includes *pdsch-TimeDomainAllocationList*** | ***pdsch-Config* includes *pdsch-TimeDomainAllocationList*** | **PDSCH time domain resource allocation to apply** |
|---|---|---|---|---|---|
| SI-RNTI | Type0 common | 1 | - | - | Default A for normal CP |
| | | 2 | - | - | Default B |
| | | 3 | - | - | Default C |
| SI-RNTI | Type0A common | 1 | No | - | Default A |
| | | 2 | No | - | Default B |
| | | 3 | No | - | Default C |
| | | 1,2,3 | Yes | - | *pdsch-TimeDomainAllocationList* provided in *pdsch-ConfigCommon* |
| RA-RNTI, TC-RNTI | Type1 common | 1, 2, 3 | No | - | Default A |
| | | 1, 2, 3 | Yes | - | *pdsch-TimeDomainAllocationList* provided in *pdsch-ConfigCommon* |
| P-RNTI | Type2 common | 1 | No | - | Default A |
| | | 2 | No | - | Default B |
| | | 3 | No | - | Default C |
| | | 1,2,3 | Yes | - | *pdsch-TimeDomainAllocationList* provided in *pdsch-ConfigCommon* |
| C-RNTI, MCS-C-RNTI, CS-RNTI | Any common search space associated with CORESET#0 | 1, 2, 3 | No | - | Default A |
| | | 1, 2, 3 | Yes | - | *pdsch-TimeDomainAllocationList* provided in *pdsch-ConfigCommon* |
| C-RNTI, MCS-C-RNTI, CS-RNTI | Any common search space not associated with CORESET#0, UE specific search space | 1,2,3 | No | No | Default A |
| | | 1,2,3 | Yes | No | *pdsch-TimeDomainAllocationList* provided in *pdsch-ConfigCommon* |
| | | 1,2,3 | No/Yes | Yes | *pdsch-TimeDomainAllocationList* provided in *pdsch-Config* |

FIG. 8

| DCI | PDCCH search space | *pdsch-ConfigCommon* includes *pdsch-TimeDomainAllocationList* | *pdsch-Config* includes *pdsch-TimeDomainAllocationList* | *pdsch-ConfigCommon* includes *pdsch-TimeDomainAllocationList2* | *pdsch-Config* includes *pdsch-TimeDomainAllocationList2* | PDSCH time domain resource allocation to apply |
|---|---|---|---|---|---|---|
| 1st DCI | Any common search space not associated with CORESET#0, UE specific search space | No | No | Yes/No | Yes/No | Default A |
| | | Yes | No | Yes/No | Yes/No | *pdsch-TimeDomainAllocationList* provided in *pdsch-ConfigCommon* |
| | | Yes/No | Yes | Yes/No | Yes/No | *pdsch-TimeDomainAllocationList* provided in *pdsch-Config* |
| 2nd DCI | Any common search space not associated with CORESET#0, UE specific search space | Yes/No | Yes/No | No | No | Default D |
| | | Yes/No | Yes/No | Yes | No | *pdsch-TimeDomainAllocationList2* provided in *pdsch-ConfigCommon* |
| | | Yes/No | Yes/No | Yes/No | Yes | *pdsch-TimeDomainAllocationList2* provided in *pdsch-Config* |

FIG. 9

| DCI | PDCCH search space | *pdsch-ConfigCommon* includes *pdsch-TimeDomainAllocationList* | *pdsch-Config* includes *pdsch-TimeDomainAllocationList* | *pdsch-Config* includes *pdsch-TimeDomainAllocationList2* | PDSCH time domain resource allocation to apply |
|---|---|---|---|---|---|
| 1st DCI | Any common search space not associated with CORESET#0, UE specific search space | No | No | Yes/No | Default A |
| | | Yes | No | Yes/No | *pdsch-TimeDomainAllocationList* provided in *pdsch-ConfigCommon* |
| | | Yes/No | Yes | Yes/No | *pdsch-TimeDomainAllocationList* provided in *pdsch-Config* |
| 2nd DCI | Any common search space not associated with CORESET#0, UE specific search space | No | Yes/No | No | Default A |
| | | Yes | Yes/No | No | *pdsch-TimeDomainAllocationList* provided in *pdsch-ConfigCommon* |
| | | Yes/No | Yes/No | Yes | *pdsch-TimeDomainAllocationList2* provided in *pdsch-Config* |

FIG. 10

Default PDSCH time domain resource allocation A for normal CP

| Row index | *dmrs-TypeA-Position* | PDSCH mapping type | $K_0$ | $S$ | $L$ |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

FIG. 11

Default PDSCH time domain resource allocation B

| **Row index** | ***dmrs-TypeA-Position*** | **PDSCH mapping type** | $K_0$ | $S$ | $L$ |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | 2,3 | Type B | 1 | 2 | 2 |
| 7 | 2,3 | Type B | 1 | 4 | 2 |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| 13 | 2,3 | Type B | 0 | 2 | 7 |
| 14 | 2 | Type A | 0 | 2 | 12 |
| | 3 | Type A | 0 | 3 | 11 |
| 15 | 2,3 | Type B | 1 | 2 | 4 |
| 16 | Reserved | | | | |

FIG. 12

Default PDSCH time domain resource allocation C

| Row index | *dmrs-TypeA-Position* | PDSCH mapping type | $K_0$ | *S* | *L* |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | Reserved | | | | |
| 7 | Reserved | | | | |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| 13 | 2,3 | Type B | 0 | 2 | 7 |
| 14 | 2 | Type A | 0 | 2 | 12 |
| | 3 | Type A | 0 | 3 | 11 |
| 15 | 2,3 | Type A | 0 | 0 | 6 |
| 16 | 2,3 | Type A | 0 | 2 | 6 |

FIG. 13

- The starting symbol $S$ relative to the start of the slot, and the number of consecutive symbols $L$ counting from the symbol $S$ allocated for the PDSCH are determined from the start and length indicator $SLIV$:

if $(L-1) \leq 7$ then $$SLIV = 14 \cdot (L-1) + S$$

else $$SLIV = 14 \cdot (14 - L + 1) + (14 - 1 - S)$$

where $0 < L \leq 14 - S$

FIG. 14

Applicable PUSCH time domain resource allocation

| **RNTI** | **PDCCH search space** | ***pusch-ConfigCommon*** **includes** ***pusch-TimeDomainAllocationList*** | ***pusch-Config*** **includes** ***pusch-TimeDomainAllocationList*** | **PUSCH time domain resource allocation to apply** |
|---|---|---|---|---|
| PUSCH scheduled by MAC RAR as described in subclause 8.2 of [6, TS 38.213] | | No | - | PUSCH Default A |
| | | Yes | | *pusch-TimeDomainAllocationList* provided in *pusch-ConfigCommon* |
| C-RNTI, MCS-C-RNTI, TC-RNTI, CS-RNTI | Any common search space associated with CORESET 0 | No | - | PUSCH Default A |
| | | Yes | | *pusch-TimeDomainAllocationList* provided in *pusch-ConfigCommon* |
| C-RNTI, MCS-C-RNTI, TC-RNTI, CS-RNTI | Any common search space not associated with CORESET 0, UE specific search space | No | No | PUSCH Default A |
| | | Yes | No | *pusch-TimeDomainAllocationList* provided in *pusch-ConfigCommon* |
| | | No/Yes | Yes | *pusch-TimeDomainAllocationList* provided in *pusch-Config* |

FIG. 15

Applicable PUSCH time domain resource allocation

| RNTI | PDCCH search space | *pusch-ConfigCommon* includes *pusch-TimeDomainAllocationList2* | *pusch-Config* includes *pusch-TimeDomainAllocationList2* | PUSCH time domain resource allocation to apply |
|---|---|---|---|---|
| PUSCH scheduled by MAC RAR as described in subclause 8.2 of [6, TS 38.213] | | No | - | PUSCH Default B |
| | | Yes | | *pusch-TimeDomainAllocationList2* provided in *pusch-ConfigCommon* |
| C-RNTI, MCS-C-RNTI, TC-RNTI, CS-RNTI | Any common search space associated with CORESET 0 | No | - | PUSCH Default B |
| | | Yes | | *pusch-TimeDomainAllocationList2* provided in *pusch-ConfigCommon* |
| C-RNTI, MCS-C-RNTI, TC-RNTI, CS-RNTI | Any common search space not associated with CORESET 0, UE specific search space | No | No | PUSCH Default B |
| | | Yes | No | *pusch-TimeDomainAllocationList2* provided in *pusch-ConfigCommon* |
| | | No/Yes | Yes | *pusch-TimeDomainAllocationList2* provided in *pusch-Config* |

FIG. 16

Default PUSCH time domain resource allocation A for normal CP (PUSCH default A)

| **Row index** | **PUSCH mapping type** | $K_2$ | $S$ | $L$ |
|---|---|---|---|---|
| 1 | Type A | $j$ | 0 | 14 |
| 2 | Type A | $j$ | 0 | 12 |
| 3 | Type A | $j$ | 0 | 10 |
| 4 | Type B | $j$ | 2 | 10 |
| 5 | Type B | $j$ | 4 | 10 |
| 6 | Type B | $j$ | 4 | 8 |
| 7 | Type B | $j$ | 4 | 6 |
| 8 | Type A | $j+1$ | 0 | 14 |
| 9 | Type A | $j+1$ | 0 | 12 |
| 10 | Type A | $j+1$ | 0 | 10 |
| 11 | Type A | $j+2$ | 0 | 14 |
| 12 | Type A | $j+2$ | 0 | 12 |
| 13 | Type A | $j+2$ | 0 | 10 |
| 14 | Type B | $j$ | 8 | 6 |
| 15 | Type A | $j+3$ | 0 | 14 |
| 16 | Type A | $j+3$ | 0 | 10 |

FIG. 17

Default PUSCH time domain resource allocation B for normal CP (PUSCH default B)

| Row index | PUSCH mapping type | $K_2$ | $S$ | $L$ | $Rep$ |
|---|---|---|---|---|---|
| 1 | Type A | $j$ | 0 | 14 | 1 |
| 2 | Type A | $j$ | 0 | 10 | 1 |
| 3 | Type B | $j$ | 4 | 14 | 1 |
| 4 | Type B | $j$ | 4 | 10 | 1 |
| 5 | Type B | $j$ | 8 | 14 | 1 |
| 6 | Type B | $j$ | 8 | 10 | 1 |
| 7 | Type B | $j$ | 12 | 14 | 1 |
| 8 | Type B | $j$ | 12 | 10 | 1 |
| 9 | Type A | $j+1$ | 0 | 14 | 1 |
| 10 | Type A | $j+1$ | 0 | 10 | 1 |
| 11 | Type A | $j+2$ | 0 | 14 | 1 |
| 12 | Type A | $j+2$ | 0 | 10 | 1 |
| 13 | Type A | $j+3$ | 0 | 14 | 1 |
| 14 | Type A | $j+3$ | 0 | 10 | 1 |
| 15 | Type B | $j$ | 0 | 4 | 2 |
| 16 | Type B | $j$ | 0 | 7 | 2 |

FIG. 18

```
PUSCH-TimeDomainResourceAllocation ::= SEQUENCE {
        k2                                  INTEGER(0..32)          OPTIONAL,
        mappingTYpe                         ENUMERATED {typeA, typeB},
        startSymbolAndLength                INTEGER (0..127)
}
```

FIG. 19

```
PUSCH-TimeDomainResourceAllocation2 ::= SEQUENCE {
        k2                    INTEGER(0..32)              OPTIONAL,
        mappingTYpe           ENUMERATED {typeA, typeB},
        startSymbol           INTEGER (0..13)
        length                INTEGER (1..14)
        repetition            INTEGER (1..8)              OPTIONAL
}
```

FIG. 20

BASE STATION APPARATUS, TERMINAL APPARATUS AND COMMUNICATION METHOD FOR REPETITIVE TRANSMISSION OF PUSCH

CROSS-REFERENCE TO RELATED APPLICATION

The present application claims priority based on Japanese Patent Application No. 2019-67641 filed in Japan on Mar. 29, 2019, the content of which is hereby fully incorporated herein by reference.

FIELD

The present invention relates to a base station apparatus, a terminal apparatus, and a communication method.

BACKGROUND

At present, Long Term Evolution (LTE)-Advanced Pro and New Radio (NR) technology are being studied and standardized in the Third Generation Partnership Project (3GPP) as a radio access scheme and a radio network technology for a 5th generation cellular system (NPL 1).

The 5th generation cellular system requires three anticipated scenarios for services: enhanced Mobile BroadBand (eMBB) that realizes high-speed and high-capacity transmission, Ultra-Reliable and Low Latency Communication (URLLC) that realizes low-latency and high-reliability communication, and massive Machine Type Communication (mMTC) that allows a large number of machine type devices to be connected such as devices connected in Internet of Things (IoT).

PRIOR ART LITERATURE

Non-Patent Literature

Non-Patent Literature 1: RP-161214, NTT DOCOMO, “Revision of SI: Study on New Radio Access Technology”, June 2016

SUMMARY

Technical Problem

The objective of one aspect of the present invention is to provide a terminal apparatus, a base station apparatus and a communication method capable of performing efficient communication in the wireless communication system described above.

Solution to Problem (1) In order to achieve the above objective, the aspect of the present invention adopts the following means. That is, a terminal apparatus according to one aspect of the present invention includes: a reception unit configured to receive (i) a radio resource control (RRC) message including first configuration information and (ii) downlink control information including a first field via a physical downlink control channel (PDCCH); and a transmission unit configured to perform one or more repetitive transmissions of a physical uplink shared channel (PUSCH) based on the first configuration information and the first field. The first configuration information is for configuring at least one of a starting symbol of a time resource corresponding to an index indicated by the first field, a number of symbols allocated to one PUSCH corresponding to the index, and a nominal number of repetitive transmissions corresponding to the index.

(2) Further, a base station apparatus according to one aspect of the present invention includes: a transmission unit configured to transmit (i) an RRC message including first configuration information and (ii) downlink control information including a first field via a physical downlink control channel (PDCCH) and a reception unit configured to receive one or more repetitive transmissions of a physical uplink shared channel (PUSCH) based on the first configuration information and the first field. The first configuration information is for configuring at least one of a starting symbol of a time resource corresponding to an index indicated by the first field, a number of symbols allocated to one PUSCH corresponding to the index, and a nominal number of repetitive transmissions corresponding to the index.

(3) Further, a communication method for a terminal apparatus according to one aspect of the present invention comprises: receiving (i) an RRC message including first configuration information and (ii) downlink control information including a first field via a physical downlink control channel (PDCCH) and performing one or more repetitive transmissions of a physical uplink shared channel (PUSCH) based on the first configuration information and the first field. The first configuration information is for configuring at least one of a starting symbol of a time resource corresponding to an index indicated by the first field, a number of symbols allocated to one PUSCH corresponding to the index, and a nominal number of repetitive transmissions corresponding to the index.

(4) Further, a communication method for a base station apparatus according to one aspect of the present invention comprises: transmitting (i) an RRC message including first configuration information and (ii) downlink control information including a first field via a physical downlink control channel (PDCCH); and receiving one or more repetitive transmissions of a physical uplink shared channel (PUSCH) based on the first configuration information and the first field. The first configuration information is for configuring at least one of a starting symbol of a time resource corresponding to an index indicated by the first field, a number of symbols allocated to one PUSCH corresponding to the index, and a nominal number of repetitive transmissions corresponding to the index.

Invention Effect

According to one aspect of the present invention, the base station apparatus and the terminal apparatus can perform communication efficiently.

BRIEF DESCRIPTION OF THE DRAWINGS

FIG. 1 is a conceptual diagram of a wireless communication system according to an embodiment of the present invention.

FIG. 7 is a diagram illustrating an example of PDSCH mapping types according to an embodiment of the present invention.

FIG. 8 is a diagram defining which resource allocation table is applied to a Physical Downlink Shared CHannel (PDSCH) time domain resource allocation according to an embodiment of the present invention.

FIG. 9 is an example of a table illustrating a method for determining a resource allocation table applied to a PDSCH according to an embodiment of the present invention.

FIG. 10 is another example of a table illustrating a method for determining a resource allocation table applied to a PDSCH according to an embodiment of the present invention.

FIG. 11 is a diagram illustrating an example of a default table A according to an embodiment of the present invention.

FIG. 12 is a diagram illustrating an example of a default table B according to an embodiment of the present invention.

FIG. 13 is a diagram illustrating an example of a default table C according to an embodiment of the present invention.

FIG. 14 is a diagram illustrating an example of calculating a start and length indicator (SLIV) according to an embodiment of the present invention.

FIG. 15 is an example of a table illustrating a method for determining a resource allocation table applied to a Physical Uplink Shared CHannel (PUSCH) according to an embodiment of the present invention.

FIG. 16 is another example of a table illustrating a method for determining a resource allocation table applied to a PUSCH according to an embodiment of the present invention.

FIG. 17 is a diagram illustrating an example of a PUSCH default table A for a Normal Cyclic Prefix (NCP) according to an embodiment of the present invention.

FIG. 18 is a diagram illustrating an example of a PUSCH default table B for an NCP according to an embodiment of the present invention.

FIG. 19 is a diagram illustrating an example of a parameter configuration of an RRC parameter PUSCH-TimeDomainResourceAllocation according to an embodiment of the present invention.

FIG. 20 is a diagram illustrating an example of a parameter configuration of an RRC parameter PUSCH-TimeDomainResourceAllocation2 according to an embodiment of the present invention.

DETAILED DESCRIPTION OF THE PREFERRED EMBODIMENTS

Figure 2:
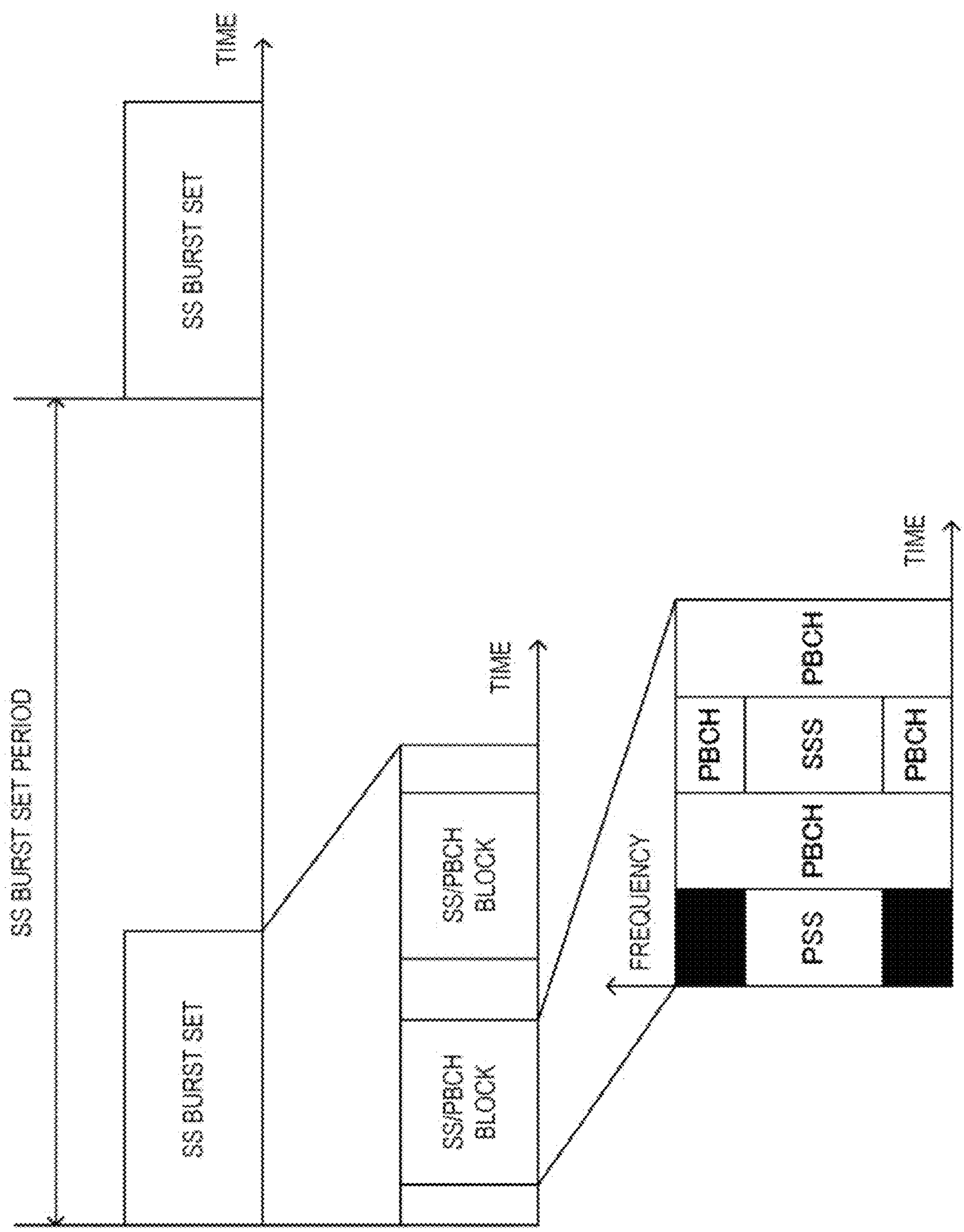
FIG. 2 is a diagram illustrating an example of a Synchronization signal (SS)/Physical Broadcast CHannel (PBCH) block and an SS burst set according to an embodiment of the present invention.

Hereinafter, the embodiments of the present invention will be described.

FIG. 1 is a conceptual diagram of a wireless communication system according to an embodiment of the present invention. In FIG. 1, a wireless communication system includes a terminal apparatus 1A, a terminal apparatus 1B, and a base station apparatus 3. Hereinafter, each of the terminal apparatus 1A and the terminal apparatus 1B is also referred to as a terminal apparatus 1.

The terminal apparatus 1 is also referred to as a user terminal, a mobile station apparatus, a communication terminal, a mobile device, a terminal, a user equipment (UE), or a mobile station (MS). The base station apparatus 3 is also referred to as a radio base station apparatus, a base station, a radio base station, a fixed station, a Node B (NB), an eNB (evolved Node B), a BTS (Base Transceiver Station), a BS (Base Station), an NR NB (NR Node B), an NNB, a TRP (Transmission and Reception Point), or a gNB. The base station apparatus 3 may include a core network apparatus. Further, the base station apparatus 3 may include one or more transmission reception points 4. At least a part of the functions/processes of the base station apparatus 3 described below may be functions and processes at each of the transmission reception points 4 included in the base station apparatus 3. The base station apparatus 3 may serve the terminal apparatus 1 with one or more cells in a communicable range (communication area) controlled by the base station apparatus 3. Further, the base station apparatus 3 may serve the terminal apparatus 1 with one or more cells in a communicable range (communication area) controlled by one or more transmission reception points 4. Further, the base station apparatus 3 may divide one cell into a plurality of partial areas (beamed areas) and serve the terminal apparatus 1 in each of the partial areas. Here, the partial region may be identified based on a beam index or a preceding index used in beamforming.

The wireless communication link from the base station apparatus 3 to the terminal apparatus 1 is referred to as a downlink. The wireless communication link from the terminal apparatus 1 to the base station apparatus 3 is referred to as an uplink.

In FIG. 1, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used in a wireless communication between the terminal apparatus 1 and the base station apparatus 3.

Further, in FIG. 1, Universal-Filtered Multi-Carrier (UFMC), Filtered OFDM (F-OFDM), Windowed OFDM, or Filter-Bank Multi-Carrier (FBMC) may be used in the wireless communication between the terminal apparatus 1 and the base station apparatus 3.

Further, although OFDM is described as a transmission scheme with OFDM symbols in the present invention, the present invention may also include cases where the other transmission schemes described above are used.

Furthermore, in FIG. 1, the CP may not be used, or the above-described transmission scheme with zero padding may be used instead of the CP in the wireless communication between the terminal apparatus 1 and the base station apparatus 3. Further, the CP or zero padding may be added both forward and backward.

One aspect of the present invention may be operated in carrier aggregation or dual connectivity with a radio access technology (RAT) such as LTE or LTE-A/LTE-A Pro. At this time, the aspect may be applied to a part or all cells or cell groups, carriers or carrier groups (e.g., primary cells (PCell), secondary cells (SCell), primary secondary cells (PSCell), master cell groups (MCG), secondary cell groups (SCG), or the like). Further, the aspect may be operated independently and used in a stand-alone means. In a dual connectivity operation, a Special Cell (SpCell) may be referred to as a PCell of an MCG or a PSCell of an SCG, respectively, depending on whether a Medium Access Control (MAC) entity is associated with the MCG or the SCG. If the dual connectivity operation is not performed, an SpCell is referred to as a PCell. The SpCell supports PUCCH transmission and contention based random access.

In the present invention, one serving cell or a plurality of serving cells may be configured for the terminal apparatus 1. The plurality of configured serving cells may include one primary cell and one or more secondary cells. The primary cell may be a serving cell in which an initial connection establishment procedure has been performed, a serving cell in which a connection re-establishment procedure has been initiated, or a cell indicated as a primary cell in a handover procedure. One or more secondary cells may be configured at a point of time when or after a radio resource control (RRC) connection is established. However, the plurality of configured serving cells may include one primary secondary cell. The primary secondary cell may be a secondary cell, in which control information can be transmitted in the uplink, among one or more secondary cells configured for the terminal apparatus 1. Further, a subset of two types of serving cells, i.e., a master cell group and a secondary cell group, may be configured for the terminal apparatus 1. The master cell group may include one primary cell and zero or more secondary cells. The secondary cell group may include one primary secondary cell and zero or more secondary cells.

Time Division Duplex (TDD) and/or Frequency Division Duplex (FDD) may be applied to the wireless communication system according to the present invention. The Time Division Duplex (TDD) scheme or the Frequency Division Duplex (FDD) scheme may also be applied to all of multiple cells. Further, cells to which the TDD scheme is applied and cells to which the FDD scheme is applied may be aggregated. The TDD scheme may be referred to as an unpaired spectrum operation. The FDD scheme may be referred to as a paired spectrum operation.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in a sidelink is referred to as a sidelink component carrier (or a sidelink carrier). The downlink component carrier, the uplink component carrier, and/or the sidelink component carrier are collectively referred to as a component carrier (or a carrier).

The physical channels and the physical signals according to the present invention will be described below.

In FIG. 1, the following physical channels are used in the wireless communication between the terminal apparatus 1 and the base station apparatus 3.

PBCH: Physical Broadcast CHannel

PDCCH: Physical Downlink Control CHannel

PDSCH: Physical Downlink Shared CHannel

PDCCH: Physical Uplink Control CHannel

PUSCH: Physical Uplink Shared CHannel

PRACH: Physical Random Access CHannel

The PBCH is used to broadcast essential information blocks (Master Information Block (MTB), Essential information Block (EIB), and Broadcast Channel (BCH)) including essential system information required by the terminal apparatus 1.

Further, the PBCH may be used to broadcast a time index within a period of a block of a synchronization signal (also referred to as an SS/PBCH block). Here, the time index is information for indicating indexes of the synchronization signal and the PBCH within the cell. For example, in a case that the SS/PBCH block is transmitted with an assumption of using three transmission beams (Quasi-CoLocation (QCL) regarding transmission filtering configuration and reception spatial parameters), a time order within a predetermined period or within a configured period may be indicated. Further, the terminal apparatus may recognize a difference in the time indexes as a difference in the transmission beams.

The PDCCH is used to transmit (or carry) Downlink Control Information (DCI) in downlink wireless communication (i.e., wireless communication from the base station apparatus 3 to the terminal apparatus 1). Here, one or more pieces of DCI (which may be referred to as DCI formats) are defined for transmission of the downlink control information. That is, a field for the downlink control information is defined as DCI and mapped to information bits. The PDCCH is transmitted in a PDCCH candidate. The terminal apparatus 1 monitors a set of PDCCH candidates in a serving cell. The monitoring may mean attempting to decode the PDCCH according to a certain DCI format.

For example, the following DCI formats can be defined.

DCI format 0_0

DCI format 0_1

DCI format 0_2

DCI format 1_0

DCI format 1_1

DCI format 1_2

DCI format 2_0

DCI format 2_1

DCI format 2_2

DCI format 2_3

DCI format 0_0 may be used to schedule a PUSCH in a serving cell. DCI format 0_0 may include information indicating scheduling information of the PUSCH (frequency domain resource allocation and time domain resource allocation). DCI format 0_0 may be attached with a CRC (Cyclic Redundancy Check) scrambled by any one of a Cell-RNTI (C-RNTI), a Configured Scheduling (CS)-RNTI, an MCS-C-RNTI, and/or a Temporary C-RNTI (TC-RNTI) among Radio Network Temporary identifiers (RNTIs) that are identifiers. DCI format 0_0 may be monitored in a common search space or a UE-specific search space.

DCI format 0_1 may be used to schedule a PUSCH in a serving cell. DCI format 0_1 may include information indicating scheduling information of the PUSCH (frequency domain resource allocation and time domain resource allocation), information indicating a BandWidth Part (BWP), a Channel State Information (CSI) request, a Sounding Reference Signal (SRS) request, and/or information related to an antenna port. DCI format 0_1 may be attached with a CRC scrambled by any one of a C-RNTI, a CS-RNTI, a Semi Persistent (SP)-CSI-RNTI, and/or an MCS-C-RNTI among RNTIs, DCI format 0_1 may be monitored in a UE-specific search space.

DCI format 0_2 may be used to schedule a PUSCH in a serving cell. DCI format 0_2 may include information indicating scheduling information of the PUSCH (frequency domain resource allocation and time domain resource allocation), information indicating a BWP, a CSI request, an SRS request, and/or information related to an antenna port. DCI format 0_2 may be attached with a CRC scrambled by any one of a C-RNTI, a CSI-RNTI, an SP-CSI-RNTI, and/or at a MCS-C-RNTI among RNTIs. DCI format 0_2 may be monitored in a UE-specific search space. DCI format 0_2 may be referred to as DCI format 0_1A and the like.

DCI format 1_0 may be used to schedule a PDSCH in a serving cell. DCI format 1_0 may include information indicating scheduling information of the PDSCH (frequency domain resource allocation and time domain resource allocation). DCI format 1_0 may be attached with a CRC scrambled by any one of a C-RNTI, a CS-RNTI, an MCS-C-RNTI, a Paging RNTI (P-RNTI), a System Information (SI)-RNTI, a Random Access (RA)-RNTI, and/or a TC-RNTI among identifiers. DCI format 1_0 may be monitored in a common search space or a UE-specific search space.

DCI format 1_1 may be used to schedule a PDSCH in a serving cell. DCI format 1_1 may include information indicating scheduling information of the PDSCH (frequency domain resource allocation and time domain resource allocation), information indicating a BandWidth Part (BWP), a Transmission Configuration Indication (TCI), and/or information related to an antenna port. DCI format 1_1 may be attached with a CRC scrambled by any one of a C-RNTI, a CS-RNTI, and/or an MCS-C-RNTI among RNTIs. DCI format 1_1 may be monitored in a UE-specific, search space.

DCI format 1_2 may be used to schedule a PDSCH in a serving cell. DCI format 1_2 may include information indicating scheduling information of the PDSCH (frequency domain resource allocation and time domain resource allocation), information indicating a BWP, a TCI, and/or information related to an antenna port. DCI format 1_2 may be attached with a CRC scrambled by any one of a C-RNTI, a CS-RNTI, and/or MCS-C-RNTI among RNTIs. DCI format 1_2 may be monitored in a UE-specific search space. DCI format 1_2 may be referred to as DCI format 1_1A and the like.

DCI format 2_0 is used to indicate a slot format of one or more slots. The slot format is defined as a slot format in which each OFDM symbol within the slot is classified as any one of downlink, flexible, and uplink symbols. For example, in a case that a slot format is 28, DDDDDDDDDDDDFU is applied to OFDM symbols of fourteen symbols within the slot for which the slot format 28 has been indicated. Here, D is a downlink symbol, F is a flexible symbol, and U is an uplink symbol. Further, the slot will be described later.

DCI format 2_1 is used to notify the terminal apparatus 1 of physical resource blocks and OFDM symbols that may be assumed not to be transmitted. Besides, this information may be referred to as a preemption indication (intermittent transmission indication).

DCI format 2_2 is used to transmit a Transmit Power Control (TPC) command for the PUSCH and the PUSCH.

DCI format 2_3 is used to transmit a group of TPC commands for sounding reference signal (SRS) transmission performed by one or more terminal apparatuses 1. Further, an SRS request may be transmitted along with the TPC command. Further, the SRS request and the TPC command may be defined in DCI format 2_3 for an uplink without the PUTSCH or the PUCCH or for an uplink in which the transmit power control of the SRS is not associated with the transmit power control of the PUSCH.

The DCI for the downlink is also referred to as a downlink grant or a downlink assignment. Here, the DCI for the uplink is also referred to as an uplink grant or an uplink assignment. The DCI may also be referred to as a DCI format.

A Cyclic Redundancy Check (CRC) parity bit attached to a DCI format transmitted by one PDCCH is scrambled by an SI-RNTI, a P-RNTI, a C-RNTI, a CS-RNTI, an RA-RNTI or a TC-RNTI. The SI-RNTI may be an identifier used to broadcast system information. The P-RNTI may be an identifier used for paging and notification of system information modification. The C-RNTI, the MCS-C-RNTI, and the CS-RNTI are identifiers used to identify the terminal apparatus within a cell. The TC-RNTI is an identifier used to identify the terminal apparatus 1 that has transmitted a random access preamble in a contention-based random access procedure.

The C-RNTI is used to control the PDSCH or the PUSCH in one or more slots. The CS-RNTI is used to periodically allocate resources of the PDSCH or the PUSCH. The MCS-C-RNTI is used to indicate the use of a predetermined MCS table for grant-based transmission. The TC-RNTI is used to control PDSCH transmission or PUSCH transmission in one or more slots. The TC-RNTI is used to schedule retransmission of a random access Message 3 and transmission of a random access Message 4. The RA-RNTI is determined according to frequency and time location information of a physical random access channel on which a random access preamble has been transmitted.

The C-RNTI and/or other RNTIs may use different values corresponding to traffic types of the PDSCH or the PUSCH. The C-RNTI and other RNTIs may use different values corresponding to service types (eMBB, URLLC, and/or mMTC) of data transmitted on the PDSCH or the PUSCH. The base station apparatus 3 may use RNTIs of different values corresponding to service types of data to be transmitted. The terminal apparatus 1 may identify service types of data transmitted on an associated PDSCH or PUTSCH according to the value of an RNTI (used for scrambling) applied to received DCI.

The PUCCH is used to transmit uplink control information (UCI) in uplink wireless communication (i.e., wireless communication from the terminal apparatus 1 to the base station apparatus 3). Here, the uplink control information may include channel state information (CSI) for indicating a state of a downlink channel. Further, the uplink control information may include a scheduling request (SR) for requesting UL-SCH resources. Further, the uplink control information may include a Hybrid Automatic Repeat request ACKnowledgement (HARQ-ACK). HARQ-ACK may indicate HARQ-ACK for downlink data (Transport block, Medium Access Control Protocol Data Unit (MAC PDU), Downlink-Shared Channel (DL-SCH)).

The PDSCH is used to transmit downlink data (Downlink-Shared CHannel: DL-SCH) from a medium access (MAC: Medium Access Control) layer. Further, in a case of the downlink, the PDSCH is also used to transmit System Information (SI), a Random Access Response (RAR), and the like.

The PUSCH may be used to transmit uplink data (Uplink-Shared CHannel (UL-SCH)) from the MAC layer or transmit HARQ-ACK and/or CSI along with the uplink data. Furthermore, the PSUCH may be used to transmit the CSI only or the HARQ-ACK and CSI only. In other words, the PSUCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive radio resource control (RRC) signaling (also referred to as RRC message or RRC information) in an RRC layer. Further, the base station apparatus 3 and the terminal apparatus 1 may transmit and/or receive a Medium Access Control (MAC) element in a MAC layer. Further, the RRC layer of the terminal apparatus 1 acquires the system information notified from the base station apparatus 3. Here, the RRC signaling, the system information, and/or the MAC control element may also be referred to as higher layer signaling or higher layer parameters. The higher layer here means a higher layer as viewed from a physical layer and may thus include one or more layers such as a MAC layer, an RRC layer, an RLC layer, a PDCP layer, and a NAS (Non Access Stratum) layer. For example, in processing of the MAC layer, the higher layer may include one or more layers such as an RRC layer, an RLC layer, a PDCP layer, and a NAS layer. Hereinafter, "A is given in the higher layer" or "A is given by the higher layer" may mean that the higher layer (mainly, RRC layer, MAC layer, etc.) of the terminal apparatus 1 receives A from the base station apparatus 3, and the received A is given from the higher layer of the terminal apparatus 1 to the physical layer of the terminal apparatus 1. The expression that a higher layer parameter is configured in the terminal apparatus 1 may mean that a higher layer parameter is provided to the terminal apparatus.

The PDSCH or PUSCH may be used to transmit the RRC signaling and the MAC control element. Here, in the PDSCH, the RRC signaling transmitted from the base station apparatus 3 may be signaling common to a plurality of terminal apparatuses 1 within a cell. Further, the RRC signaling transmitted from the base station apparatus 3 may be signaling dedicated to a certain terminal apparatus 1 (also referred to as dedicated signaling). That is, terminal apparatus specific (UE specific) information may be transmitted using signaling dedicated to a certain terminal apparatus 1. Further, the PUSCH may be used to transmit UE capability in the uplink.

In FIG. 1, the following downlink physical signals are used for downlink wireless communication. Here, the downlink physical signals are not used to transmit information output from the higher layers but are used by the physical layer.

Synchronization signal (SS)

Reference Signal (RS)

The synchronization signal includes a Primary Synchronization Signal (PSS) and a Secondary Synchronization Signal (SSS). A cell ID can be detected by using the PSS and the SSS, The synchronization signal is used for the terminal apparatus 1 to establish synchronization in the frequency domain and the time domain of the downlink, Here, the synchronization signal may be used for the terminal apparatus 1 to select precoding or a beam in precoding or beamforming performed by the base station apparatus 3. Furthermore, the beam may be referred to as a transmission or reception filtering configuration, or a spatial domain transmission filter or a spatial domain reception filter.

A reference signal is used for the terminal apparatus 1 to perform propagation path compensation on a physical channel. Here, the reference signal may be used for the terminal apparatus 1 to calculate downlink CSI. Further, the reference signal may be used for a numerology such as radio parameters or subcarrier spacing or may be used for fine synchronization to achieve FFT window synchronization.

In the present invention, any one or more of the following downlink reference signals are used.

DMRS (Demodulation Reference Signal)

CSI-RS (Channel State information Reference Signal)

PTRS (Phase Tracking Reference Signal)

TRS (Tracking Reference Signal)

The DMRS is used to demodulate a modulated signal. Besides, in the DMRS, two types of reference signals, i.e., a reference signal for demodulating the PBCH and a reference signal for demodulating the PDSCH, may be defined, or both reference signals may be referred to as DMRS. The CSI-RS is used for measurement of Channel State information (CSI) and beam management, and a transmission method for a periodic, semi-persistent, or aperiodic CSI reference signal is applied. In the CSI-RS, a Non-Zero Power (NZP) CSI-RS and a Zero Power (ZP) CSI-RS with zero transmission power (or reception power) may be defined. Here, the ZP CSI-RS may be defined as a CSI RS resource that has zero transmission power or that is not transmitted. The PTRS is used to track a phase in a time axis for the purpose of ensuring a frequency offset caused by phase noise. The TRS is used to ensure a Doppler shift during high speed travel. In addition, the TRS may be used as one configuration for the CSI-RS. For example, a radio resource may be configured with one port CSI-RS as the TRS.

In the present invention, any one or more of the following uplink reference signals are used.

DMRS (Demodulation Reference Signal)

PTRS (Phase Tracking Reference Signal)

SRS (Sounding Reference Signal)

The DMRS is used to demodulate a modulated signal. Besides, in the DMRS, two types of reference signals, i.e., a reference signal for demodulating the PUCCH and a reference signal for demodulating the PUSCH, may be defined, or both reference signals may be referred to as DMRS. The SRS is used for measurement of uplink Channel State Information (CSI), channel sounding, and beam management. The PTRS is used to track a phase in a time axis for the purpose of ensuring a frequency offset caused by phase noise.

The downlink physical channel and/or the downlink physical signal are/is collectively referred to as a downlink signal. The uplink physical channel and/or the uplink physical signal are/is collectively referred to as an uplink signal. The downlink physical channel and/or the uplink physical channel are/is collectively referred to as a physical channel. The downlink physical signal and/or the uplink physical signal are/is collectively referred to as a physical signal.

BCH, UL-SCH and DL-SCH are transport channels. A channel used in a medium access control (MAC) layer is referred to as a transport channel. The unit of a transport channel used in the MAC layer is referred to as a Transport Block (TB) or a MAC PDU (Protocol Data Unit). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

FIG. 2 is a diagram illustrating an example of an SS/PBCH block (also referred to as a synchronization signal block, an SS block or an SSB) and an SS burst set (also referred to as a synchronization signal burst set) according to an embodiment of the present invention. FIG. 2 illustrates an example in which two SS/PBCH blocks are included in the SS burst set that is periodically transmitted and each SS/PBCH block includes four consecutive OFDM symbols.

The SS/PBCH block is a unit block including at least the synchronization signal (PSS, SSS) and/or the PBCH. Transmitting the signal/channel included in an SS/PBCH block is expressed as transmitting an SS/PBCH block. In a case that the base station apparatus 3 transmits the synchronization signal and/or the PBCH by using one or more SS/PBCH blocks in the SS burst set, a downlink transmission beam independent for each SS/PBCH block may be used.

In FIG. 2, the PSS, the SSS, and the PBCH are time/frequency-multiplexed in one SS/PBCH block. However, the order in which the PSS, the SSS and/or the PBCH are multiplexed in the time domain may be different from that in the example illustrated in FIG. 2.

The SS burst set may be transmitted periodically. For example, a period used for initial access and a period configured for a connected (Connected or RRC Connected) terminal apparatus may be defined. Further, the period configured for the connected (Connected or RRC Connected) terminal apparatus may be configured in the RRC layer. Further, the period configured for the connected (Connected or RRC_Connected) terminal may be a period of a radio resource in the time domain during which transmission is potentially to be performed, and actually, whether the transmission is to be performed during the period may be determined by the base station apparatus 3. Furthermore, the period used for the initial access may be predefined in specifications or the like.

The SS burst set may be determined based on a System Frame Number (SFN). Further, a starting position (boundary) of the SS burst set may be determined based on the SFN and the period.

An SSB index (also referred to as an SS/PBCH block index) is assigned to the SS/PBCH block according to a temporal position in the SS burst set. The terminal apparatus 1 calculates the SSB index based on information of the PBCH and/or information of the reference signal included in the detected SS/PBCH block.

The same SSB index is assigned to SS/PBCH blocks with the same relative time within each SS burst set among a plurality of SS burst sets. The SS/PBCH blocks with the same relative time within each SS burst set among the plurality of SS burst sets may be assumed to be QCL (or the same downlink transmission beam is applied). Further, antenna ports for the SS/PBCH blocks with the same relative time within each SS burst set among the plurality of SS burst sets may be assumed to be QCL with respect to an average delay, a Doppler shift, and a spatial correlation.

The SS/PBCH blocks to which the same SSB index is assigned within a period of a certain SS burst set may be assumed to be QCL with respect to an average delay, an average gain, a Doppler spread, a Doppler shift, and a spatial correlation. A configuration corresponding to one or more SS/PBCH blocks (or reference signals) that are QCL may be referred to as a QCL configuration.

The number of SS/PBCH blocks (also referred to as the number of SS blocks or the number of SSBs) may be defined as, for example, the number of SS/PBCH blocks within an SS burst or an SS burst set or in an SS/PBCH block period. Further, the number of SS/PBCH blocks may indicate the number of beam groups for cell selection within an SS burst or an SS burst set or in an SS/PBCH block period. Here, the beam groups may be defined as the number of different SS/PBCH blocks or the number of different beams included within the SS burst or the SS burst set or in the SS/PBCH block period.

Hereinafter, the reference signal described in the present invention includes a downlink reference signal, a synchronization signal, an SS/PBCH block, a downlink DM-RS, a CSI-RS, an uplink reference signal, an SRS, and/or an uplink DM-RS. For example, the downlink reference signal, the synchronization signal, and/or the SS/PBCH block may be referred to as a reference signal. The reference signal used in the downlink includes a downlink reference signal, a synchronization signal, an SS/PBCH block, a downlink DM-RS, a CSI-RS, and/or the like. The reference signal used in the uplink includes an uplink reference signal, an SRS, an uplink DM-RS, and/or the like.

Further, the reference signal may be used for Radio Resource Measurement (RRM). Furthermore, the reference signal may be used for beam management.

The beam management may be a procedure of the base station apparatus 3 and/or the terminal apparatus 1 for matching directivity of an analog beam and/or a digital beam in a transmission apparatus (e.g., the base station apparatus 3 in the downlink and the terminal apparatus 1 in the uplink) with directivity of an analog beam and/or a digital beam in a reception apparatus (e.g., the terminal apparatus 1 in the downlink and the base station apparatus 3 in the uplink) to acquire a beam gain.

In addition, a procedure for configuring, setting or establishing a beam pair link may include the following procedures.

Beam selection

Beam refinement

Beam recovery

For example, the beam selection may be a procedure for selecting a beam in communication between the base station apparatus 3 and the terminal apparatus 1. Further, the beam refinement may be a procedure for further selecting a beam having a higher gain or changing a beam to an optimum beam between the base station apparatus 3 and the terminal apparatus 1 by movement of the terminal apparatus 1. The beam recovery may be a procedure for re-selecting the beam when the quality of a communication link is degraded due to blockage caused by a blocking object, a passing person, or the like in communication between the base station apparatus 3 and the terminal apparatus 1.

The beam management may include the beam selection and the beam refinement. The beam recovery may include the following procedures.

Detection of beam failure

Discovery of new beam

Transmission of beam recovery request

Monitoring of response to beam recovery request

For example, when the transmission beam of the base station apparatus 3 is selected in the terminal apparatus 1, a Reference Signal Received Power (RSRP) of an SSS included in an SS/PBCH block or a CSI-RS may be used, or the CSI may be used. Further, a CSI-RS Resource Index (CRI) may be used as a report to the base station apparatus 3, or an index indicated by sequence of demodulation reference signals (DMRS) used for demodulating the PBCH and/or the PBCH included in the SS/PBCH block may be used.

Further, the base station apparatus 3 indicates a CRI or a time index of the SS/PBCH when indicating a beam to the terminal apparatus 1, and the terminal apparatus 1 performs reception based on the indicated CRI or the time index of the SS/PBCH. At this time, the terminal apparatus 1 may configure a spatial filter based on the indicated CRI or time index of the SS/PBCH and perform reception. Further, the terminal apparatus 1 may perform reception by using the assumption of Quasi-Co-Location (QCL). The expression that a certain signal (such as antenna port, synchronization signal, or reference signal) and another signal (such as antenna port, synchronization signal, or reference signal) are "QCL" or "use the assumption of QCL" can be interpreted as that the certain signal is associated with another signal.

If a long term property of a channel on which a certain symbol in a certain antenna port is carried can be inferred from a channel on which a certain symbol in the other antenna port is carried, then the two antenna ports are said to be QCL. The long term property of the channel includes one or more of a delay spread, a Doppler spread, a Doppler shift, an average gain, and an average delay. For example, in a case that an antenna port 1 and an antenna port 2 are QCL with respect to an average delay, this means that a reception timing for the antenna port 2 may be inferred from a reception timing for the antenna port 1.

The QCL can also be extended to beam management. Therefore, spatially extended QCL may be newly defined. For example, the long term property of a channel in the assumption of QCL of a spatial domain may be an arrival angle (e.g., Angle of Arrival (AoA), a Zenith angle of Arrival (ZoA), or the like), and/or an angle spread (e.g., an Angle Spread of Arrival (ASA) or a Zenith angle Spread of Arrival (LSA)), a transmission angle (AoD, ZoD, or the like), an angle spread of the transmission angle (e.g., an Angle Spread of Departure (ASD) or a Zenith angle Spread of Departure (ZSD)), a spatial correlation, or a reception spatial parameter in a radio link or channel.

For example, in a case that the antenna port 1 and the antenna port 2 are considered to be QCL with respect to a reception spatial parameter, this means that a reception beam for receiving signals from the antenna port 2 may be inferred from a reception beam (a reception spatial filter) for receiving signals from the antenna port 1.

A combination of long term properties which may be considered to be QCL may be defined as a QCL type. For example, the following types may be defined.

Type A: Doppler shift, Doppler spread, average delay, delay spread

Type B: Doppler shift, Doppler spread

Type C: Average delay, Doppler shift

Type D: Reception spatial parameter

The above-mentioned QCL types may configure and/or indicate the assumption of QCL between one or two reference signals and the PDCCH or PDSCH DMRS in the RRC and/or MAC layer and/or the DCI as a transmission configuration indication (TCI). For example, when the terminal apparatus 1 receives the PDCCH in a case that an index #2 of the PBCH/SS block and the QCL type A+QCL type B are configured and/or indicated as one state of the TCI, the terminal apparatus 1, at the time of receiving the PDCCH DIVERS, may receive the PDCCH DMRS by considering the Doppler shift, the Doppler spread, the average delay, the delay spread, and the reception space parameters in the reception of the PBCH/SS block index #2 as the long term properties of the channel, and may perform synchronization or propagation path estimation. At this time, a reference signal (e.g., the PBCH/SS block in the example described above) indicated by the TCI may be referred to as a source reference signal, and a reference signal (e.g., the PDCCH DMRS in the example described above) affected by the long term properties inferred from the long term properties of the channel in a case that the source reference signal is received may be referred to as a target reference signal. Further, one or more WI states and a combination of a source reference signal and a QCL type for each state may be configured with the RRC, and the TCI may be indicated in the MAC layer or the DCI for the terminal apparatus 1.

The operations of the base station apparatus 3 and terminal apparatus 1 equivalent to the beam management may be defined through the assumption of QCL of the spatial domain and the radio resource (time and/or frequency) as the beam management and beam indication/report by this method.

The subframe will be described below. The subframe referred in the present invention may also be referred to as a resource unit, a radio frame, a time period, a time interval, or the like.

Figure 3:
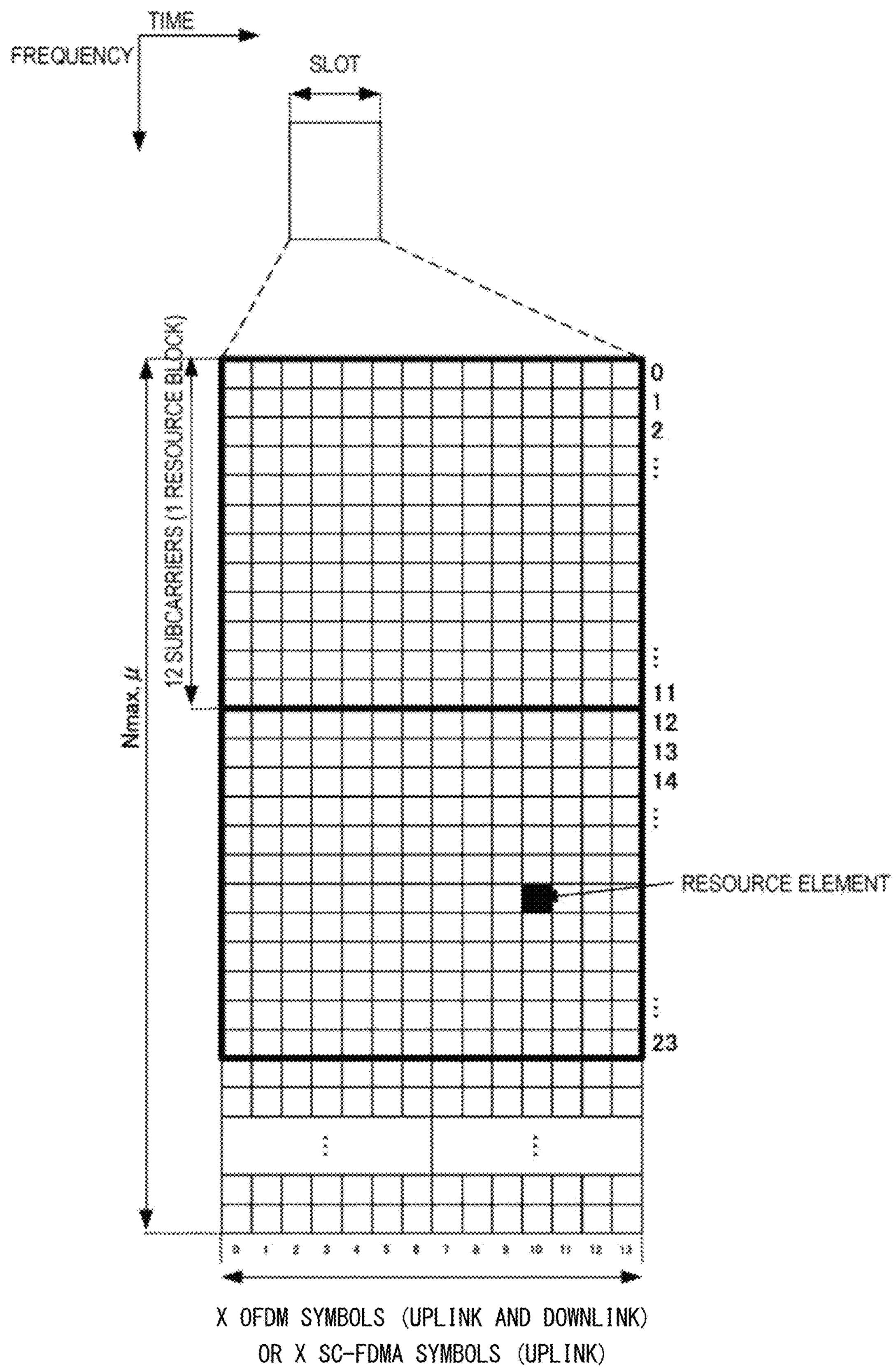
FIG. 3 is a diagram illustrating an example of a schematic configuration of uplink and downlink slots according to an embodiment of the present invention.

FIG. 3 is a diagram illustrating an example of a schematic configuration of uplink and downlink slots according to a first embodiment of the present invention. The length of each radio frame is 10 ms. Further, each of the radio frames includes 10 subframes and W slots. Further, one slot includes X OFDM symbols. In other words, the length of one subframe is 1 ms. For each slot, the time length is defined by subcarrier spacing. For example, in a case that the subcarrier spacing of OFDM symbols is 15 kHz with a Normal Cyclic Prefix (NCP) used, X=7 and X=14 correspond to 0.5 ms and 1 ms, respectively. Further, in a case that the subcarrier spacing is 60 kHz, X=7 and X=14 correspond to 0.125 ms and 0.25 ms, respectively. Furthermore, for example, in a case of X=14, W=10 when the subcarrier spacing is 15 kHz, and W=40 when the subcarrier spacing is 60 kHz. FIG. 3 illustrates a case of X=7 as an example. In addition, expansion can similarly be performed even in a case of X=14. Further, the uplink slot is similarly defined, and the downlink slot and the uplink slot may be separately defined. Further, the bandwidth of the cell in FIG. 3 may also be defined as a BandWidth Part (BWP). Furthermore, the slot may be defined as a Transmission Time Interval (TTI). The slot may not be defined as a TTI. The TTI may be a transmission period of the transport block.

The signal or the physical channel transmitted in each of the slots may be expressed by a resource grid. The resource grid is defined by a plurality of subcarriers and a plurality of OFDM symbols for each numerology (e.g., subcarrier spacing and cyclic prefix length) and for each carrier. The number of subcarriers constituting one slot depends on each of downlink and uplink bandwidths of a cell, respectively. Each element within a resource grid is referred to as a resource element. The resource element may be identified by using a subcarrier number and an OFDM symbol number.

The resource grid is used to express mapping of a certain physical downlink channel (such as the PDSCH) or a certain physical uplink channel (such as the PUSCH) to resource elements. For example, in a case that the subcarrier spacing is 15 kHz and the number X of OFDM symbols included in a subframe is 14, and in the case of NCP, one physical resource block is defined by 14 consecutive OFDM symbols in the time domain and by 12*Nmax consecutive subcarriers in the frequency domain. Nmax is the maximum number of resource blocks determined by a subcarrier spacing configuration μ described below. In other words, the resource grid includes (14*12*Nmax, μ) resource elements. Since Extended CP (ECP) is supported only by the subcarrier spacing of 60 kHz, one physical resource block is defined by, for example, 12 (the number of OFDM symbols included in one slot)*4 (the number of slots included in one subframe) =48 consecutive OFDM symbols in the time domain and by 12*Nmax, μ consecutive subcarriers in the frequency domain. In other words, the resource grid includes (48*12.*Nmax, μ) resource elements.

Reference resource blocks, common resource blocks, physical resource blocks, and virtual resource blocks are defined as resource blocks. One resource block is defined as twelve consecutive subcarriers in the frequency domain. The reference resource blocks are common to all subcarriers; for example, resource blocks may be configured with subcarrier spacing of 15 kHz and numbered in an ascending order. A subcarrier index 0 at a reference resource block index 0 may be referred to as a reference point A (which may simply be referred to as a "reference point"). The common resource blocks are resource blocks numbered from 0 in an ascending order at each subcarrier spacing configuration μ from the reference point A. The resource grid described above is defined by the common resource blocks. The physical resource blocks are resource blocks included in a Bandwidth Part (BWP) described below and numbered from 0 in an ascending order, and the physical resource blocks are resource blocks included in a BWP and numbered from 0 in an ascending order. A certain physical uplink channel is first mapped to a virtual resource block. Thereafter, the virtual resource block is mapped to a physical resource block. Hereinafter, a resource block may be a virtual resource block, a physical resource block, a common resource block, or a reference resource block.

Next, the subcarrier spacing configuration μ will be described. As described above, one or more OFDM numerologies are supported in the NR. In a certain BWP, the subcarrier spacing configuration μ (μ=0, 1, . . . , 5) and the cyclic prefix length are given by a higher layer for a downlink BWP and given by a higher layer for an uplink BWP. Here, when μ is given, a subcarrier spacing Δf is given by Δf=2^μ·15 (kHz).

In the subcarrier spacing configuration μ, the slots are counted in an ascending order from 0 to N^{subframe, μ}_{slot}−1 within a subframe and counted in an ascending order from 0 to N^{frame, μ}_{slot}−1 within a frame. N^{slot}_{symb} consecutive OFDM symbols are present in a slot based on the slot configuration and the cyclic prefix. N^{slot}_{symb} is 14. The start of the slot n^{μ}_{s} in the subframe is aligned in time with the start of the (n^{μ}{s}*N^{slot}_{symb})th OFDM symbol in the same subframe.

Figure 4:
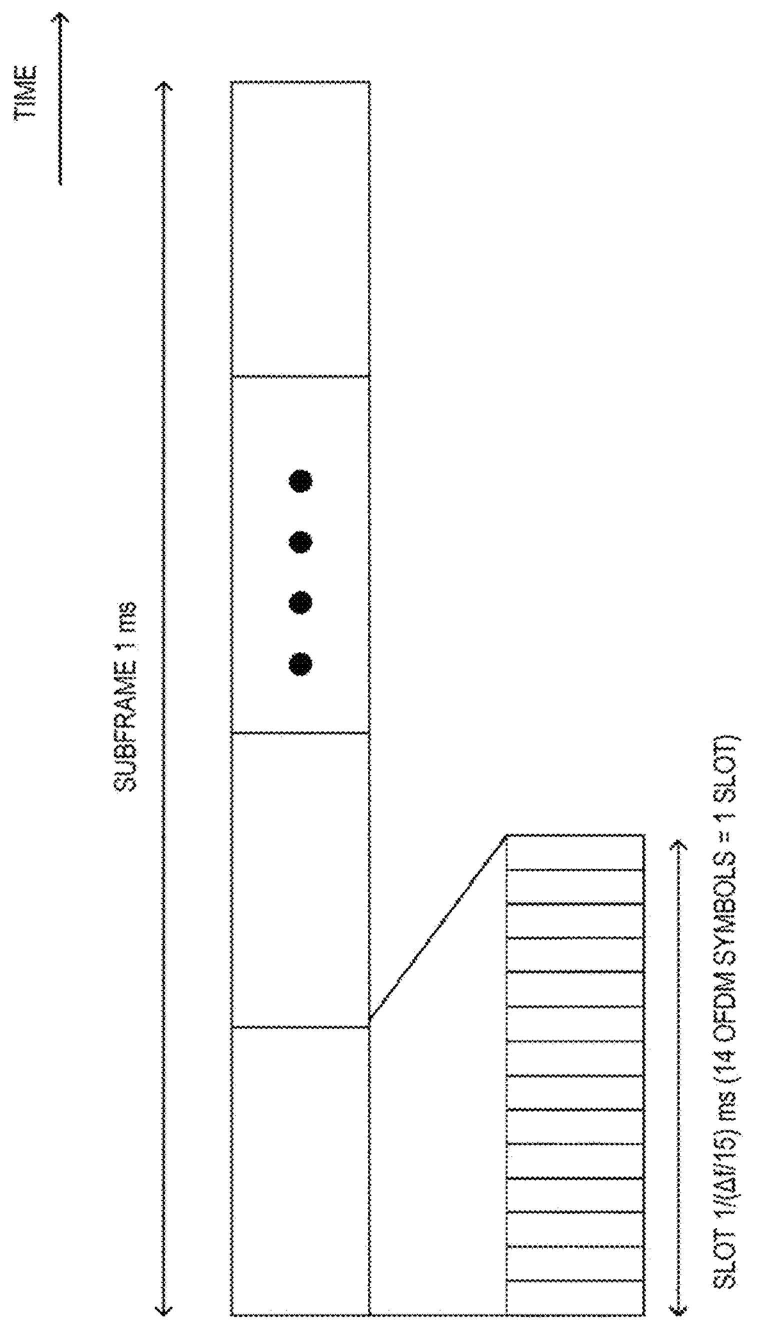
FIG. 4 is a diagram illustrating a relationship among a subframe, a slot, and a mini-slot in the time domain according to an embodiment of the present invention.

Next, a subframe, a slot, and a mini-slot will be described below. FIG. 4 is a diagram illustrating a relationship among a subframe, a slot, and a mini-slot in the time domain according to an embodiment of the present invention. As illustrated in FIG. 4, three types of time units are defined. The subframe is 1 ms regardless of the subcarrier spacing, the number of OFDM symbols included in a slot is 7 or 14, and the slot length differs depending on the subcarrier spacing. Here, in a case that the subcarrier spacing is 15 kHz, fourteen OFDM symbols are included in one subframe. The downlink slot may be referred to as a PDSCH mapping type A. The uplink slot may be referred to as a PUSCH mapping type A.

The mini-slot (which may be referred to as a sub-slot) is a time unit including fewer OFDM symbols than OFDM symbols included in one slot. In FIG. 4, a case in which the mini-slot includes two OFDM symbols is illustrated as an example. The OFDM symbols in the mini-slot may match the timing for the OFDM symbols constituting the slot. Besides, the minimum unit for scheduling may be a slot or a mini-slot. Further, allocating a mini-slot may be referred to as non-slot based scheduling. Also, scheduling a mini-slot may be expressed as scheduling a resource in which the relative time positions of the starting positions of a reference signal and data are fixed. The downlink mini-slot may be referred to as a PDSCH mapping type B. The uplink mini-slot may be referred to as a PUSCH mapping type B.

Figure 5:
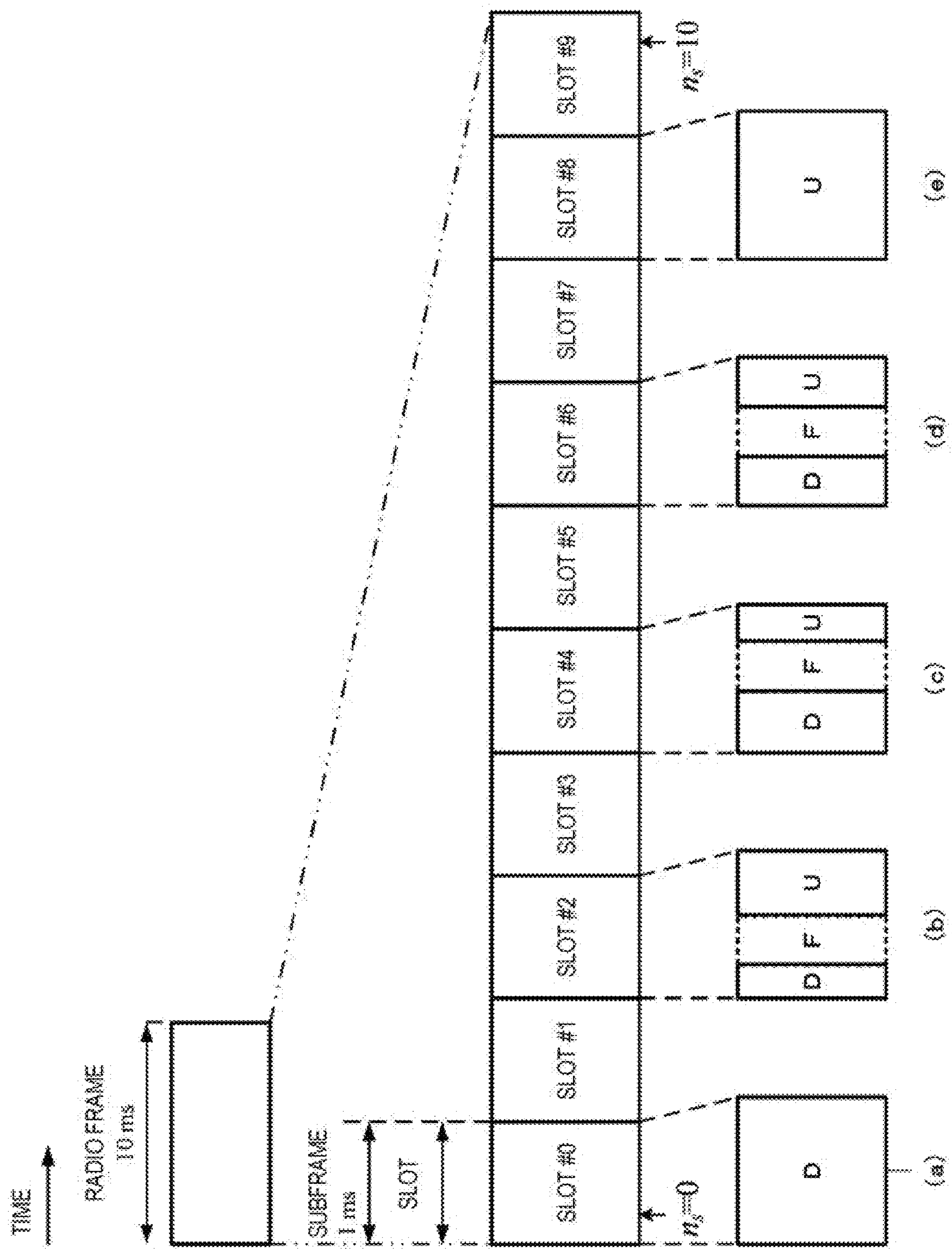
FIG. 5 is a diagram illustrating an example of a slot or a subframe according to an embodiment of the present invention.

FIG. 5 is a diagram illustrating an example of a slot or a subframe according to an embodiment of the present invention. Here, a case that the slot length is 1 ms at the subcarrier spacing of 15 kHz is illustrated as an example. In FIG. 5, D indicates the downlink and U indicates the uplink. As illustrated in FIG. 5, a certain time period (for example, a minimum time period to be allocated to one UE in the system) may include one or more of the followings:

Downlink symbol

Flexible symbol

Uplink symbol.

Besides, the ratios thereof may be predetermined as a slot format. Further, the ratio thereof may be defined by the number of downlink OFDM symbols included in a slot or defined by a starting position and an ending position in the slot. Further, the ratio thereof may also be defined by the number of uplink OFDM symbols or DFT-S-OFDM symbols included in a slot or defined by a starting position and an ending position in the slot. Furthermore, scheduling slot may be expressed as scheduling a resource in which the relative time positions of a reference signal and a slot boundary are fixed.

The terminal apparatus 1 may receive a downlink signal or a downlink channel with a downlink symbol or a flexible symbol. The terminal apparatus 1 may transmit an uplink signal or a downlink channel with an uplink symbol or a flexible symbol.

FIG. 5(*a*) is an example in which a certain time period (which may be referred to as, for example, a minimum unit of time resource that can be allocated to one UE, a time unit, or the like; and a plurality of minimum units of the time resource may be bundled and referred to as a time unit) is entirely used for downlink transmission. FIG. 5(*b*) illustrates an example in which an uplink is scheduled, for example, via a PDCCH in a first time resource, and an uplink signal is transmitted via a flexible symbol including a processing delay of the PDCCH, a time for switching from a downlink to an uplink, and generation of a transmission signal. FIG. 5(*c*) illustrates an example in which a certain time period is used to transmit a PDCCH and/or a downlink PDSCH in a first time resource and used to transmit a PUSCH or a PUCCH with a gap for a processing delay, a time for switching from a downlink to an uplink, and generation of a transmission signal. Here, in an example, an uplink signal may be used to transmit HARQ-ACK and/or CSI, i.e., UCI. FIG. 5(*d*) illustrates an example in which a certain time period is used to transmit a PDCCH and/or a PDSCH in a first time resource and used to transmit an uplink PUSCH and/or a PUCCH with a gap for a processing delay, a time for switching from a downlink to an uplink, and generation of a transmission signal. Here, in an example, an uplink signal may be used to transmit uplink data, i.e., UL-SCH. FIG. 5(*e*) is an example in which a certain time period is entirely used for uplink transmission (PUSCH or PUCCH).

The downlink part and uplink part described above may include a plurality of OFDM symbols similar to those in the LTE.

Figure 6:
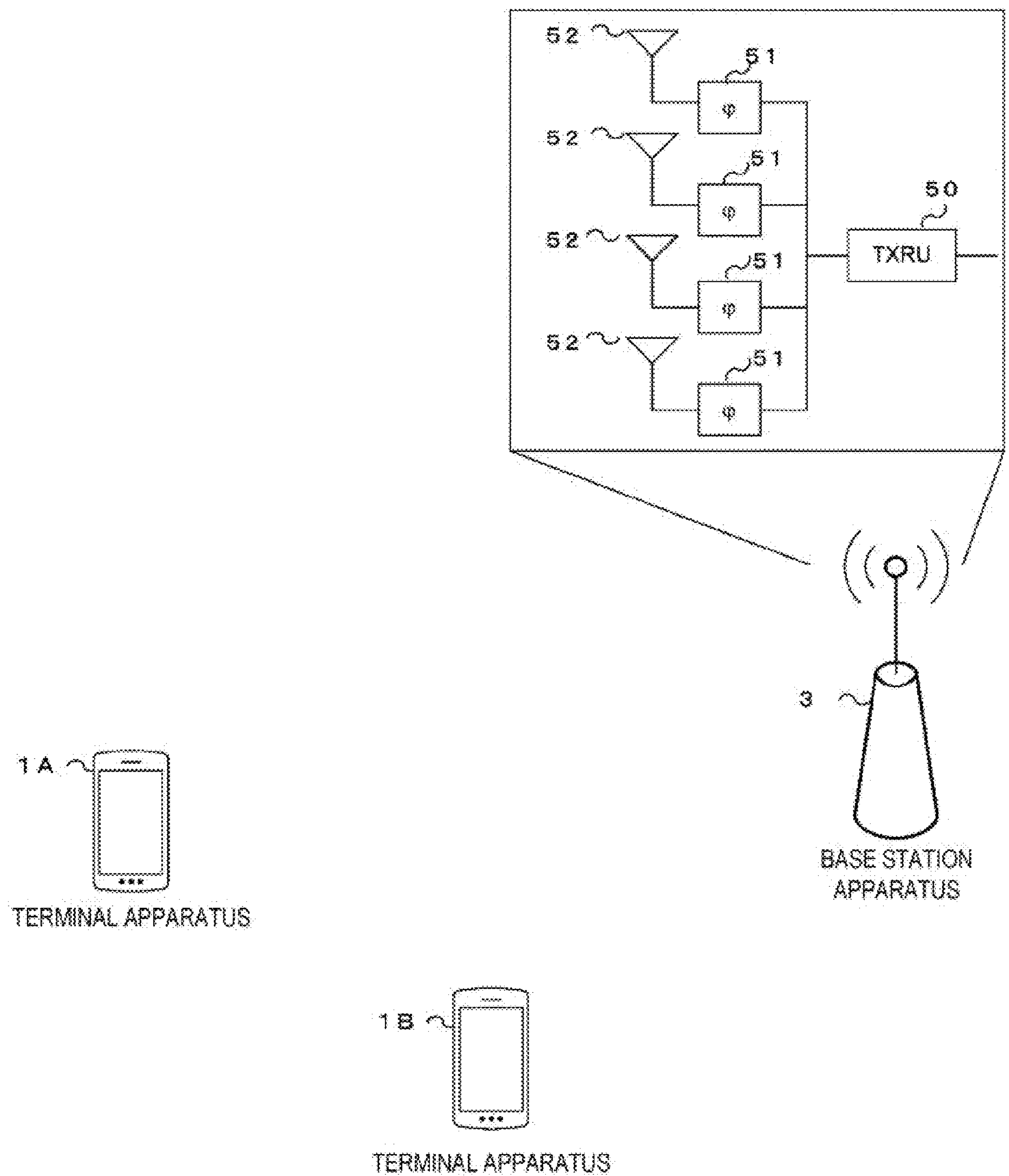
FIG. 6 is a diagram illustrating an example of beamforming according to an embodiment of the present invention.

FIG. 6 is a diagram illustrating an example of beamforming according to an embodiment of the present invention. A plurality of antenna elements are connected to one transceiver unit (TXRU) 50, a phase is controlled by a phase shifter 51 for each antenna element, and a beam can be directed to an arbitrary direction with respect to a transmission signal by transmission from each antenna element 52. Typically, the TXRU may be defined as an antenna port, and only the antenna port may be defined in the terminal apparatus 1. Since the directivity can be directed in any direction by controlling the phase shifter 51, the base station apparatus 3 can communicate with the terminal apparatus 1 by using a beam having a high gain.

Hereinafter, a BandWidth Part (MVP) will be described. The BWP is also referred to as a carrier BWP. The BWP may be configured for each of the downlink and the uplink. The BWP is defined as a set of consecutive physical resources selected from consecutive subsets of common resource blocks. The terminal apparatus 1 can be configured with up to four BWPs in which one downlink carrier BWP (DL BWP) is activated at a certain time. The terminal apparatus 1 can be configured with up to four BWPs in which one uplink carrier BWP (UL BWP) is activated at a certain time. In a case of carrier aggregation, the BWP may be configured in each serving cell. At this time, the fact that one BWP is configured in a certain serving cell may be expressed as a fact that no BWP is configured. Further, the fact that two or more BWPs are configured may be expressed as a fact that the BWP is configured.

<MAC Entity Operation>

In an activated serving cell, there is always one active (activated) BWP. BWP switching for a certain serving cell is used to activate an inactive (deactivated) BWP and deactivate an active (activated) BWP. The BWP switching for a certain serving cell is controlled by a PDCCH indicating a downlink assignment or an uplink grant. The BWP switching for a certain serving cell may be further controlled by a BWP inactivity timer, RRC signaling, or the MAC entity itself at the start of a random access procedure. In addition of an SpCell (PCell or PSCell) or activation of SCell, one MVP is first active without receiving a PDCCH indicating a downlink assignment or an uplink grant. The first active DL BWP and a UL BWP (first active UL BWP) may be specified by an RRC message transmitted from the base station apparatus 3 to the terminal apparatus 1. The active BWP for a certain serving cell is specified by an RRC or a PDCCH transmitted from the base station apparatus 3 to the terminal apparatus 1. Further, the first active DL BWP and a UL BWP (first active UL BWP) may be included in a Message 4, In an unpaired spectrum (e.g., TDD band, etc.), a DL BWP and a UL BWP are paired, and the BWP switching is common to the UL and the DL. The MAC entity of the terminal apparatus 1 applies normal processing in an active BWP for each activated serving cell for which the MVP is configured. The normal processing includes transmitting the UL-SCH, transmitting the RACH, monitoring the PDCCH, transmitting the PUCCH, transmitting the SRS, and receiving the DL-SCH. The MAC entity of the terminal apparatus 1 does not transmit the UL-SCH, does not transmit the RACH, does not monitor the PDCCH, does not transmit the PUCCH, does not transmit the SRS, and does not receive the DL-SCH in an inactive BWP for each activated serving cell for which the BWP is configured. In a case that a certain serving cell is deactivated, an active BWP may not be present (for example, an active BWP is deactivated).

<RRC Operation>

A BWP information element (IE) included in an RRC message (system information to be notified or information sent in a dedicated RRC message) is used to configure the BWP. The RRC message transmitted from the base station apparatus 3 is received by the terminal apparatus 1. For each serving cell, a network (such as the base station apparatus 3) configures, for the terminal apparatus 1, at least an initial BWP including at least a downlink BWP and one uplink BWP (such as in a case that the serving cell is configured with an uplink) or two uplink BWPs (such as in a case that a supplementary uplink is used). Furthermore, the network may configure an additional uplink BWP or downlink BWP for a certain serving cell. The BWP configuration is divided into an uplink parameter and a downlink parameter. Further, the BWP configuration is also divided into a common parameter and a dedicated parameter. The common parameter (e.g., a BWP uplink common IE, a BWP downlink common IE, etc.) is cell specific. The common parameter for an initial BWP of a primary cell is also provided in system information. For all other serving cells, the network provides the common parameters with dedicated signals. The BWP is identified by a BWP ID. The BWP ID of the initial BWP is 0. The BWP ID of the other BWP takes a value from 1 to 4.

When a higher layer parameter initialDownlinkBWP is not configured (provided) for the terminal apparatus 1, the initial DL BWP (e.g., initial active DL BWP) may be defined, by the location and the number of consecutive PRBs, a subcarrier spacing, and a cyclic prefix, for reception of a PDCCH in a control resource set (CORESET) for a Type0-PDCCH common search space. The position of the consecutive PRBs begins at a PRB with the lowest index and ends at a PRB with the highest index among the PRBs of the control resource set for the Type0-PDCCH common search space. When the higher layer parameter initialDownlinkBWP is configured (provided) for the terminal apparatus 1, the initial DL BWP may be indicated by the higher layer parameter initialDownlinkBWP. The higher layer parameter initialDownlinkBWP may be included in SIB1 (systemInformationBlockType1, ServingCellConfigCommonSIB) or ServingCellCongfigCommon. An information element ServingCellCongfigCommonSIB is used in SIB1 to configure a cell-specific parameter of the serving cell for the terminal apparatus 1.

That is, when the higher layer parameter initialDownlinkBWP is not configured (provided) for the terminal apparatus 1, the size of the initial DL BWP may be the number of resource blocks of the control resource set (CORESET #0) for the Type0-PDCCH common search space. When the higher layer parameter initialDownlinkBWP is configured (provided) for the terminal apparatus 1, the size of the initial DL BWP may be given by locationAndBandwidth included in the higher layer parameter initialDownlinkBWP. The higher layer parameter locationAndBandwidth may indicate the position and bandwidth of the frequency domain of the initial DL BWP.

As described above, a plurality of DL BWPs may be configured for the terminal apparatus 1. In addition, among DL BWPs configured for the terminal apparatus 1, a default DL BWP can be configured by a higher layer parameter defaultDownlinkBWP-Id. When the higher layer parameter defaultDownlinkBWP-Id is not provided for the terminal apparatus 1, the default DL BWP is the initial DL BWP.

The initial UL BWP may be provided to the terminal apparatus 1 by SIB1 (systemInformationBlockType1) or initial UplinkBWP. The information element initialUplinkBWP is used to configure the initial UL BWP. For operation in an SpCell or a secondary cell, the initial UL BWP (initial active UL BWP) may be configured (provided) for the terminal apparatus 1 by the higher layer parameter initialUplinkBWP. When a supplementary uplink carrier is configured for the terminal apparatus 1, an initial UL BWP of the supplementary uplink carrier may be configured for the terminal apparatus 1 by initialUplinkBWP included in a higher layer parameter supplementaryUplink.

Hereinafter, a control resource set (CORESET) of the present invention will be described.

A control resource set (CORESET) is time and frequency resources for searching for downlink control information.

The CORESET configuration information includes a CORESET identifier (ControlResourceSetId, CORESET-ID) and information for identifying a CORESET frequency resource. The information element ControlResourceSetId (CORESET identifier) is used to identify a control resource set in a certain serving cell. The CORESET identifier is used among BWPs in a certain serving cell. The CORESET identifier is unique among the BWPs in the serving cell. The number of CORESETs in each BWP is limited to three including an initial CORESET. In a certain serving cell, the value of the CORESET identifier takes a value from 0 to 11.

The control resource set identified by the CORESET identifier 0 (ControlResourceSetId 0) is referred to as CORESET #0. CORESET #0 may be configured by pdcch-ConfigSIB1 included in MIB or PDCCH-ConfigCommon included in ServingCellCongfigCommon. That is, the configuration information of CORESET #0 may be pdcch-ConfigSIB1 included in MIB or PDCCH-ConfigCommon included in ServingCellCongfigCommon. The configuration information of CORESET #0 may be configured by controlResourceSetZero included in PDCCH-ConfigSIB1 or PDCCH-ConfigCommon. In other words, the information element controlResourceSetZero is used to indicate CORESET #0 (common CORESET) of the initial DL BWP. A CORESET indicated by pdcch-ConfigSIB1 is CORESET #0. The information element pdcch-ConfigSIB1 in MIB or dedicated configuration is used to configure the initial DL BWP. Although the CORESET configuration information pdcch-ConfigSIB1 for CORESET #0 does not include information that explicitly identifies a CORESET identifier and a CORESET frequency resource (e.g., the number of consecutive resource blocks) and a time resource (e.g., the number of consecutive symbols), the CORESET frequency resource (e.g., the number of consecutive resource blocks) and the time resource (e.g., the number of consecutive symbols) for CORESET #0 can be implicitly identified by information included in pdcch-ConfigSIB1. The information element PDCCH-ConfigCommon is used to configure a cell-specific PDCCH parameter provided by SIB. Further, PDCCH-ConfigCommon may also be provided at the time of handover and the addition of PSCell and/or SCell. The configuration information of CORESET #0 is included in the configuration of the initial BWP. That is, the configuration information of CORESET #0 may not be included in the configuration of a BWP other than the initial BWP. controlResourceSetZero corresponds to 4 bits in pdcch-ConfigSIB1 (e.g., 4 MSB bits or 4 most significant bits). CORESET #0 is a control resource set for the Type0-PDCCH common search space.

Configuration information of an additional common CORESET may be configured by commonControlResourceSet included in PDCCH-ConfigCommon. Further, the configuration information of the additional common CORESET may be used to specify the additional common CORESET for system information and/or a paging procedure. The configuration information of the additional common CORESET may be used to specify the additional common CORESET used for a random access procedure. The configuration information of the additional common CORESET may be included in configuration of each BWP. The CORESET identifier indicated by commonControlResourceSet takes a value other than 0.

A common CORESET may be a CORESET (e.g., an additional common CORESET) used for a random access procedure. Further, in the present invention, a CORESET configured by the configuration information of CORESET #0 and/or the configuration information of the additional common CORESET may be included in the common CORESET. In other words, the common CORESET may include CORESET #0 and/or the additional common CORESET. CORESET #0 may be referred to as common CORESET #0. The terminal apparatus 1 may refer to (acquire) the configuration information of the common CORESET in a BWP other than the BWP in which the common CORESET is configured.

The configuration information of one or more CORESETs may be configured by PDCCH-Config. The information element PDCCH-Config is used to configure UE-specific PDCCH parameters (e.g., CORSET, search space, etc.) for a certain BWP. The PDCCH-Config may be included in the configuration of each MVP.

That is, in the present invention, the configuration information of the common CORESET indicated by MIB is pdcch-ConfigSIB1, the configuration information of the common CORESET indicated by PDCCH-ConfigCommon is controlResourceSetZero, and the configuration information of the common CORESET (additional common CORESET) indicated by PDCCH-ConfigCommon is commonControlResourceSet. Further, the configuration information of one or more CORESETs (UE specifically configured Control Resource Sets, UE-specific CORESETs) indicated by PDCCH-Config is controlResourceSetToAddModList.

A search space is defined to search for PDCCH candidates. searchSpaceType included in configuration information of a search space indicates whether the search space is a common search space (CSS) or a UE-specific search space (USS). The UE-specific search space is derived at least from the value of a C-RNTI configured by the terminal apparatus 1. That is, the UE-specific search space is derived individually for each terminal apparatus 1. The common search space is a search space shared among a plurality of terminal apparatuses 1 and includes CCEs (Control Channel Elements) each having a predetermined index. The CCE includes a plurality of resource elements. Information of a DCI format monitored in the search space is included in the configuration information of the search space.

The configuration information of the search space includes the CORESET identifier identified by the CORESET configuration information. The CORESET identified by the CORESET identifier included in the configuration information of the search space is associated with the search space. In other words, the CORESET associated with the search space is a CORESET identified by the CORESET identifier included in the search space. The DCI format indicated by the configuration information of the search space is monitored by the associated CORESET. Each search space is associated with one CORESET. For example, the configuration information of the search space for a random access procedure may be configured by ra-SearchSpace. That is, the DCI format attached with a CRC scrambled by an RA-RNTI or a TC-RNTI is monitored in the CORESET associated with ra-SearchSpace.

The terminal apparatus 1 monitors a set of PDCCH candidates in one or more CORESETs allocated in each active serving cell configured to monitor the PDCCH. The set of PDCCH candidates corresponds to one or more search space sets. Monitoring means decoding each PDCCH candidate according to one or more monitored DCI formats. The set of PDCCH candidates monitored by the terminal apparatus 1 is defined by PDCCH search space sets. One search space set is a common search space set or a UE-specific search space set. In the above description, the search space set is referred to as a search space, the common search space set is referred to as a common search space, and the UE-specific search space set is referred to as a UE-specific search space. The terminal apparatus 1 monitors the PDCCH candidates with one or more of the following search space sets.

Type0-PDCCH common search space set (Type 0 common search space set): this search space set is configured by a higher layer parameter such as pdcch-ConfigSIB1 indicated by MIB, or searchSpaceSIB1 indicated by PDCCH-ConfigCommon, or searchSpaceZero included in PDCCH-ConfigCommon. The search space is used to monitor the DCI format with a CRC scrambled by an SI-RNRI in a primary cell.

Type0A-PDCCH common search space set (Type 0A common search space set): this search space set is configured by a higher layer parameter such as a search space searchSpaceOtherSystemInformation) indicated by PDCCH-ConfigCommon. The search space is used to monitor the DCI format with a CRC scrambled by an SI-RNRI in a primary cell.

Type1-PDCCH common search space set (Type 1 common search space set): this search space set is configured by a higher layer parameter such as a search space for a random access procedure (ra-SearchSpace) indicated by PDCCH-ConfigCommon. The search space is used to monitor the DCI format with a CRC scrambled by an RA-RNRI or a TC-RNTI in a primary cell, Type1-PDCCH common search space set is a search space set used for a random access procedure.

Type2-PDCCH common search space set (Type 2 common search space set): this search space set is configured by a higher layer parameter such as a search space for a paging procedure (pagingSearchSpace) indicated by PDCCH-ConfigCommon. The search space is used to monitor the DCI format with a CRC scrambled by a P-RNTI in a primary cell.

Type3-PDCCH common search space set (Type 3 common search space set): in this search space set, a search space type indicated by a higher layer parameter such as PDCCH-Config is configured by a common search space (SearchSpace). The search space is used to monitor the DCI format with a CRC scrambled by an INT-RNTI, an SFI-RNTI, a TPC-PUSCH-RNTI, a TPC-PUCCH-RNTI, or a TPC-SRS-RNTI. For the primary cell, the search space is used to monitor the DCI format with a CRC scrambled by a C-RNTI, a CS-RNTI(s), or an MCS-C-RNTI.

UE-specific, search space set: in this search space set, a search space type indicated by a higher layer parameter such as PDCCH-Config is configured by a UE-specific search space (SearchSpace). The search space is used to monitor the DCI format with a CRC scrambled by a C-RNTI, a CS-RNTI(s), or an MCS-C-RNTI.

If the terminal apparatus 1 is provided with one or more search space sets by corresponding higher layer parameters (searchSpaceZero, searchSpaceSIB1, searchSpaceOtherSystemInformation, pagingSearchSpace, ra-SearchSpace, etc.) and provided with a C-RNTI or a CS-RNTI, the terminal apparatus 1 may monitor PDCCH candidates for DCI format 0_0 and DCI format 1_0 with a C-RNTI or a CS-INTI in the one or more search space sets.

BWP configuration information is divided into DL MVP configuration information and UL BWP configuration information. The BWP configuration information includes an information element (BWP identifier). A MVP identifier included in the DL MVP configuration information is used to identify (refer to) a DL MVP in a certain serving cell. A BWP identifier included in the UL MVP configuration information is used to identify (refer to) a UL BWP in a certain serving cell. The BWP identifier is assigned to each of the DL BWP and the UL BWP. For example, the BWP identifier corresponding to the DL BWP may be referred to as a UL BWP index. The BWP identifier corresponding to the UL BWP may be referred to as a UL BWP index. The initial DL BWP is referenced by a DL MVP identifier 0. The initial UL BWP is referenced by a UL MVP identifier 0. Each of other DL MVPs and other UL BWPs may be referenced from a BWP identifier 1 to maxNrofBWPs. In other words, the BWP identifier set to 0 (bwp-Id=0) is associated with the initial MVP and cannot be used for other BWPs. maxNrofBWPs is the maximum number of BWPs per serving cell and is 4. That is, the value of other BWP identifiers takes a value from 1 to 4. The configuration information of other higher layers is associated with a specific BWP by using the BWP identifier. The expression that the DL BWP and the UL BWP have the same MVP identifier may mean that the DL BWP and the UL MVP are paired.

The terminal apparatus 1 may be configured with one primary cell and up to 15 secondary cells.

Hereinafter, a procedure for receiving the PDSCH will be described.

The terminal apparatus 1 may decode (receive) a corresponding PDSCH by detection of a PDCCH including DCI format 1_0, DCI format 1_1, or DCI format 1_2. The corresponding PDSCH is scheduled (indicated) by the DCI format (DCI). The starting position (starting symbol) of the scheduled PDSCH is referred to as S. However, S may be referred to as the starting symbol of a time domain resource for the PDSCH. The starting symbol S of the PDSCH may be the first symbol with which the PDSCH is transmitted (mapped) in a certain slot. The starting symbol S corresponds to the start of a slot. For example, when the value of S is 0, the terminal apparatus 1 may receive the PDSCH from the first symbol in a certain slot. Further, for example, when the value of S is 2, the terminal apparatus 1 may receive the PDSCH from the third symbol of a certain slot. The number of consecutive symbols of the scheduled PDSCH is referred to as L. However, L may be referred to as a period of a time domain resource for the PDSCH. The number of consecutive symbols L is counted from the starting symbol S. The determination of S and L assigned to the PDSCH will be described later. However, as described below, L may be a nominal period of a time domain resource for the PUSCH. In other words, the period (number of symbols) of the actually transmitted PDSCH may be different from L.

The PDSCH mapping types have a PDSCH mapping type A and a PDSCH mapping type B. In the PDSCH mapping type A, S takes a value from 0 to 3. L takes a value from 3 to 14. However, the sum of S and L takes a value from 3 to 14. In the PDSCH mapping type B, S takes a value from 0 to 12. L takes a value from {2, 4, 7}. However, the sum of S and L takes a value from 2 to 14.

The position of a DMRS symbol for the PDSCH depends on the PDSCH mapping type. The position of a first DMRS symbol for the PDSCH depends on the PDSCH mapping type. In the PDSCH mapping type A, the position of the first DIVERS symbol may be indicated by a higher layer parameter dmrs-TypeA-Position. In other words, the higher layer parameter dmrs-TypeA-Position is used to indicate the position of the first DMRS for a PDSCH or a PDSCH. dmrs-TypeA-Position may be set to either 'pos2' or 'pos3'. For example, when dmrs-TypeA-Position is set to 'pos2', the position of the first DMRS symbol for the PDSCH may be the third symbol in a slot. For example, when dmrs-TypeA-Position is set to 'pos3', the position of the first DMRS symbol for the PDSCH may be the fourth symbol in a slot. Here, S takes a value of 3 only when dmrs-TypeA-Position is set to 'pos3'. In other words, when dmrs-TypeA-Position is set to 'pos2', S takes a value from 0 to 2. In the PDSCH mapping type B, the position of the first DMRS symbol is the first symbol of an allocated PDSCH.

FIG. 7 is a diagram illustrating an example of PDSCH mapping types according to an embodiment of the present invention. FIG. 7 (A) is a diagram illustrating an example of a PDSCH mapping type A. In FIG. 7 (A), S of the allocated PDSCH is 3. L of the allocated PDSCH is 7. In FIG. 7 (A), the position of the first DMRS symbol for the PDSCH is the fourth symbol in a slot. That is, dmrs-TypeA-Position is set to 'pos3'. FIG. 7 (B) is a diagram illustrating an example of a PDSCH mapping type A. In FIG. 7 (B), S of the allocated PDSCH is 4. L of the allocated PDSCH is 4. In FIG. 7 (B), the position of the first DMRS symbol for the PDSCH is the first symbol to which the PDSCH is allocated.

Hereinafter, a method for identifying PDSCH time domain resource allocation will be described.

The base station apparatus 3 may schedule the terminal apparatus 1 to receive the PDSCH by DCI. The terminal apparatus 1 may receive the PDSCH by detection of DCI addressed to the apparatus itself. When identifying PDSCH time domain resource allocation, the terminal apparatus 1 first determines a resource allocation table to be applied to the PDSCH. The resource allocation table includes one or more PDSCH time domain resource allocation configurations. The terminal apparatus 1 may select one PDSCH time domain resource allocation configuration in the determined resource allocation table based on a value indicated by a 'Time domain resource assignment' field included in the DCI that schedules the PDSCH. In other words, the base station apparatus 3 determines PDSCH resource allocation for the terminal apparatus 1, generates a value of the 'Time domain resource assignment' field based on the determined resource allocation, and transmits the DCI including the 'Time domain resource assignment' field to the terminal apparatus 1. The terminal apparatus 1 identifies PDSCH resource allocation in a time direction based on the value of the 'Time domain resource assignment' field.

FIG. 8 is a diagram defining which resource allocation table is applied to a PDSCH time domain resource allocation according to an embodiment of the present invention. The terminal apparatus 1 may determine the resource allocation table to be applied to the PDSCH time domain resource allocation based on the table shown in FIG. 8. The resource allocation table includes one or more PDSCH time domain resource allocation configurations. In the present invention, the resource allocation tables are categorized into (I) a predefined resource allocation table and (II) a resource allocation table configured from a higher layer RRC signal. The predefined resource allocation table is defined as, for example, a default PDSCH time domain resource allocation A, a default PDSCH time domain resource allocation B, and a default PDSCH time domain resource allocation C. Further, a default PDSCH time domain resource allocation D different from the default PDSCH time domain resource allocation A may be defined. Hereinafter, the default PDSCH time domain resource allocation A is referred to as a default table A, the default PDSCH time domain resource allocation B is referred to as a default table B, the default PDSCH time domain resource allocation C is referred to as a default table C, and the default PDSCH time domain resource allocation D is referred to as a default table D.

FIG. 9 is an example of a table illustrating a method for determining a resource allocation table applied to a PDSCH according to an embodiment of the present invention. FIG. 10 is another example of a table illustrating a method for determining a resource allocation table applied to a PDSCH according to an embodiment of the present invention. FIG. 11 is a diagram illustrating an example of a default table A according to an embodiment of the present invention. FIG. 12 is a diagram illustrating an example of a default table B according to an embodiment of the present invention. FIG. 13 is a diagram illustrating an example of a default table C according to an embodiment of the present invention. In the example of FIG. 11, the number of rows in the default table A is 16, and each row indicates a PDSCH time domain resource allocation configuration. In FIG. 11, each row defines a PDSCH mapping type, a slot offset $K_0$ between a PDCCH including DCI and a PDSCH, the starting symbol S of the PDSCH in a slot, and the number of consecutively allocated symbols L.

The resource allocation table configured by a higher layer RRC signal is given by a higher layer signal pdsch-TimeDomainAllocationList. pdsch-TimeDomainAllocationList includes one or more information elements PDSCH-TimeDomainResourceAllocation. PDSCH-TimeDomainResourceAllocation indicates the PDSCH time domain resource allocation configuration. PDSCH-TimeDomainResourceAllocation can be used to configure a time domain relationship between the PDCCH including DCI and the PDSCH. In other words, pdsch-TimeDomainAllocationList is a list that includes one or more information elements. One PDSCH-TimeDomainResourceAllocation may be referred to as one entry (or one row). For example, pdsch-TimeDomainAllocationList may include up to 16 entries, and any one entry may be used depending on a 4-bit field included in the DCI. However, the number of entries included in pdsch-TimeDomainAllocationList may be a different number, and the number of bits of an associated field included in the DCI may be a different value. In each entry of pdsch-TimeDomainAllocationList, $K_0$, mappingType, and/or startSymbolAndLength may be indicated. $K_0$ indicates a slot offset between the PDCCH including DCI and the PDSCH. When PDSCH-TimeDomainResourceAllocation does not indicate $K_0$, the terminal apparatus 1 may assume that the value of $K_0$ is a predetermined value (e.g., 0). mappingType indicates whether a corresponding PDSCH mapping type is the PDSCH mapping type A or the PDSCH mapping type B. startSymbolAndLength is an index that gives a valid combination of the starting symbol S of a corresponding PDSCH and the number of consecutively allocated symbols L. startSymbolAndLength may be referred to as a start and length indicator (SLIV). In a case that the SLIV is applied, unlike a case of using a default table, the starting symbol S of the corresponding PDSCH and the number of consecutive symbols L are given based on the SLIV. The base station apparatus 3 can set the value of the SLIV so that the PDSCH time domain resource allocation does not exceed a slot boundary. The slot offset $K_0$ and SLIV will be described later.

The higher layer signal pdsch-TimeDomainAllocationList may be included in a cell-specific RRC parameter pdsch-ConfigCommon and/or a terminal apparatus 1 (UE) specific RRC parameter pdsch-Config. pdsch-ConfigCommon is used to configure a cell-specific parameter for a PDSCH for a certain BWP. pdsch-Config is used to configure a terminal apparatus 1 (UE) specific parameter for a PDSCH for a certain BWP.

The terminal apparatus 1 can apply different resource allocation tables for PDSCH time domain resource allocation in a case of receiving a first PDSCH and in a case of receiving a second PDSCH. The base station apparatus 3 can apply different resource allocation tables for PDSCH time domain resource allocation in a case of transmitting a first PDSCH and in a case of transmitting a second PDSCH.

The first PDSCH and the second PDSCH may be PDSCHs that transmit data of different services. For example, the first PDSCH may be a PDSCH that transmits eMBB data, and the second PDSCH may be a PDSCH that transmits URLLC data. The first PDSCH may be a PDSCH scheduled by a first DCI. The second PDSCH may be a PDSCH scheduled by a second DCI. The first DCI and the second DCI may be DCIs that schedule data of different services. For example, the first DCI may be a DCI that schedules a PDSCH that transmits eMBB data, and the second DCI may be a DCI that schedules a PDSCH that transmits URLLC data.

The first DCI and the second DCI may be DCIs each attached with a CRC scrambled by a different RNTI. For example, the first DCI is a DCI attached with a CRC scrambled by a C-RNTI that is in a first range of values, and the second DCI may be a DCI attached with a CRC scrambled by a C-RNTI that is in a second range of values different from the first range of values. For example, the first DCI is a DCI attached with a CRC scrambled by any kind of RNTI that is in a third range of values, and the second DCI may be a DCI attached with a CRC scrambled by any kind of RNTI that is in a fourth range of values different from the third range of values. For example, the first DCI may be a DCI attached with a CRC scrambled by a C-RNTI, an MCS-C-RNTI, a CS-RNTI, an SI-RNTI, an RA-RNTI, a TC-RNTI and/or a P-RNTI, and the second DCI may be a DCI attached with a CRC scrambled by a UC-RNTI. However, the UC-RNTI is an RNTI that uses a value different from the values available in the C-RNTI, the MCS-C-RNTI, the CS-RNTI, the SI-RNTI, the RA-RNTI, the TC-RNTI and the P-RNTI. However, the UC-RNTI may be an RNTI used to control a PDSCH or PUSCH of data for a given service in one or more slots.

The first DCI and the second DCI may be DCIs that use different DCI formats. For example, the first DCI may be a DCI that uses DCI format 1_1, and the second DCI may be a DCI that uses DCI format 1_2.

The first DCI and the second DCI may be DCIs that use DCI formats of different sizes. For example, the first DCI may be a DCI that uses a DCI format of a first size, and the second DCI may be a DCI that uses a DCI format of a second size different from the first size.

The first DCI and the second DCI may each indicate a service, which is applied to data of a corresponding PDSCH, in a predetermined field within a respective DCI format. For example, a field within the DCI format of the first DCI may identify that the corresponding PDSCH transmits eMBB data. For example, a field within the DCI format of the second DCI may identify that the corresponding PDSCH transmits URLL data.

The first DCI and the second DCI may be DCIS transmitted in different search spaces and/or different CORESETs.

The first DCI and the second DCI may be DCIs that schedule PDSCHs of different codebooks.

The resource allocation table configured by a higher layer RRC signal may be given by a higher layer signal (which may be an information element or an RRC parameter) different from the higher layer signal pdsch-TimeDomainAllocationList. For example, the resource allocation table may be given by a higher layer signal pdsch-TimeDomainAllocationList2. The base station apparatus 3 may indicate pdsch-TimeDomainAllocationList and/or pdsch-TimeDomainAllocationList2 by a higher layer signal. The terminal apparatus 1 may receive pdsch-TimeDomainAllocationList and/or pdsch-TimeDomainAllocationList2 by a higher layer signal.

Like pdsch-TimeDomainAllocationList, pdsch-TimeDomainAllocationList2 may include up to 16 entries, and any one entry may be used depending on a 4-bit field included in the DCI. In each entry included in pdsch-TimeDomainAllocationList2, $K_0$, mappingType, and/or startSymbolAndLength may be indicated. The values available in $K_0$, mappingType, and/or startSymbolAndLength in each entry of pdsch-TimeDomainAllocationList2 may be different from the values available in pdsch-TimeDomainAllocationList. For example, the value of $K_0$ available in pdsch-TimeDomainAllocationList may range from 0 to 32, and the value of $K_0$ available in pdsch-TimeDomainAllocationList2 may range from 0 to 4. For example, mappingType available in pdsch-TimeDomainAllocationList may be a mapping type A and a mapping type B, and mappingType available in pdsch-TimeDomainAllocationList2 may be only the mapping type B. For example, mappingType may not be indicated in pdsch-TimeDomainAllocationList2.

In a case that the higher layer signal pdsch-Config includes pdsch-TimeDomainAllocationList and the PDSCH is scheduled by the first DCI, the terminal apparatus 1 may apply pdsch-TimeDomainAllocationList included in pdsch-Config to the resource allocation table of the PDSCH. In a case that the higher layer signal pdsch-Config includes pdsch-TimeDomainAllocationList2 and the PDSCH is scheduled by the second DCI, the terminal apparatus 1 may apply pdsch-TimeDomainAllocationList2 included in pdsch-Config to the resource allocation table of the PDSCH.

In a case that the higher layer signals pdsch-Config and pdsch-ConfigCommon do not include pdsch-TimeDomainAllocationList and the PDSCH is scheduled by the first DCI, the terminal apparatus 1 may apply the default table A to the resource allocation table of the PDSCH. In a case that the higher layer signals pdsch-Config and pdsch-ConfigCommon do not include pdsch-TimeDomainAllocationList2 and the PDSCH is scheduled by the second DCI, the terminal apparatus 1 may apply the default table D to the resource allocation table of the PDSCH. In a case that pdsch-TimeDomainAllocationList and/or pdsch-TimeDomainAllocationList2 are not configured in a higher layer signal, the terminal apparatus 1 may use different default tables in the first DCI and the second DCI. In a case that pdsch-TimeDomainAllocationList and/or pdsch-TimeDomainAllocationList2 are not configured in a higher layer signal, the terminal apparatus 1 may use the same default table in the first DCI and the second DCI.

FIG. 14 is a diagram illustrating an example of calculating a SLW according to an embodiment of the present invention.

In FIG. 14, fourteen is the number of symbols included in a slot. FIG. 14 illustrates an example of calculating a SLIV in the case of a normal cyclic prefix (NCP). The value of SLIV is calculated based on the number of symbols included in a slot, the starting symbol S, and the number of consecutive symbols L. Here, the value of L is equal to or greater than 1 and does not exceed (14-S). In the case of calculating the SLIV by an ECP, 6 and 12 are used instead of the values 7 and 14 in FIG. 14.

The slot offset $K_0$ will be described below.

As described above, in the subcarrier spacing configuration μ, the slots are counted in an ascending order from 0 to N^{subframe, μ}_{slot}−1 within a subframe and counted in an ascending order from 0 to N^{frame, μ}_{slot}−1 within a frame. $K_0$ is the number of slots based on subcarrier spacing of the PDSCH. $K_0$ may take a value from 0 to 32. In a certain subframe or frame, the slot number is counted from 0 in an ascending order. The slot number n with the subcarrier spacing set to 15 kHz corresponds to the slot numbers 2n and 2n+1 with the subcarrier spacing set to 30 kHz.

When the terminal apparatus 1 detects the DCI that schedules a PDSCH, the slot allocated to the PDSCH is given by floor($n*2^{\mu PDSCH}/2^{\mu PDCCH}$)+$K_0$. The function floor (A) outputs a largest integer that does not exceed A. n is a slot in which the PDCCH that schedules the PDSCH is detected. μPDSCH is a subcarrier spacing configuration for the PDSCH. μPDCCH is a subcarrier spacing configuration for the PDCCH.

As shown in FIG. 8, the terminal apparatus 1 may determine a resource allocation table to be applied to the PDSCH time domain resource allocation based on a plurality of elements. The terminal apparatus 1 may determine the resource allocation table applied to the PDSCH scheduled by DCI at least based on a part or all of the following elements from (A) to (F).

Element (A): type of RNTI that scrambles a CRC attached to DCI.

Element (B): type of a search space in which DCI is detected.

Element (C): whether a CORESET associated with the search space is CORESET #0.

Element whether pdsch-ConfigCommon includes pdsch-TimeDomainAllocationList.

Element (E): whether pdsch-Config includes pdsch-TimeDomainAllocationList.

Element (F): SS/PBCH and CORESET multiplexing pattern.

In Element (A), the type of an RNTI that scrambles a CRC attached to DCI is any one of an SI-INTI, an RA-RNTI, a TC-RNTI, a P-RNTI, a C-RNTI, an MCS-C-RNTI, or a CS-RNTI.

In Element (B), the type of a search space in which DCI is detected is a common search space or a UE-specific search space. The common search space includes a Type 0 common search space, a Type 1 common search space, and a Type 2 common search space.

As an example A, the terminal apparatus 1 may detect DCI in any common search space associated with CORESET #0. The detected DCI is attached with a CRC scrambled by any one of a C-RNTI, an MCS-C-RNTI, and a CS-RNTI. Further, the terminal apparatus 1 may determine a resource allocation table to be applied to the PDSCH scheduled by the DCI. In a case that pdsch-ConfigCommon includes pdsch-TimeDomainAllocationList for the terminal apparatus 1, the terminal apparatus 1 may determine the resource allocation table configured from a higher layer RRC signal. The resource allocation table is given by pdsch-TimeDomainAllocationList included in pdsch-ConfigCommon. Further, in a case that pdsch-ConfigCommon does not include pdsch-TimeDomainAllocationList for the terminal apparatus 1, the terminal apparatus 1 may determine the default table A. In other words, the terminal apparatus 1 may use the default table A, which indicates the PDSCH time domain resource allocation configuration, to be applied to the determination of the PDSCH time domain resource allocation.

As an example B, the terminal apparatus 1 may detect DCI in any common search space that is not associated with CORESET #0. The detected DCI is attached with a CRC scrambled by any one of a C-RNTI, an MCS-C-RNTI, and a CS-RNTI. Further, the terminal apparatus 1 may determine a resource allocation table to be applied to the PDSCH scheduled by the DCI. In a case that pdsch-Config includes pdsch-TimeDomainAllocationList for the terminal apparatus 1, the terminal apparatus 1 may determine the resource allocation table applied to the PDSCH time domain resource allocation as a resource allocation table given by pdsch-TimeDomainAllocationList provided by pdsch-Config. In other words, in a case that pdsch-Config includes pdsch-TimeDomainAllocationList, the terminal apparatus 1 may use pdsch-TimeDomainAllocationList provided by pdsch-Config to be applied to the determination of the PDSCH time domain resource allocation regardless of whether pdsch-ConfigCommon includes pdsch-TimeDomainAllocationList. Further, in a case that pdsch-Config does not include pdsch-TimeDomainAllocationList and pdsch-ConfigCommon includes pdsch-TimeDomainAllocationList, the terminal apparatus 1 may determine the resource allocation table applied to the PDSCH time domain resource allocation as a resource allocation table given from pdsch-TimeDomainAllocationList provided by pdsch-ConfigCommon. In other words, the terminal apparatus 1 uses pdsch-TimeDomainAllocationList provided by pdsch-ConfigCommon to be applied to the determination of the PDSCH time domain resource allocation. Further, in a case that pdsch-Config does not include pdsch-TimeDomainAllocationList and pdsch-ConfigCommon does not include pdsch-TimeDomainAllocationList, the terminal apparatus 1 may determine the resource allocation table applied to the PDSCH time domain resource allocation as the default table A.

As an example C, the terminal apparatus 1 may detect DCI in a UE-specific search space. The detected DCI is attached with a CRC scrambled by any one of a C-RNTI, an MCS-C-RNTI, or a CS-RNTI. Further, the terminal apparatus 1 may determine a resource allocation table to be applied to the PDSCH scheduled by the DCI. In a case that pdsch-Config includes pdsch-TimeDomainAllocationList for the terminal apparatus 1, the terminal apparatus 1 may determine the resource allocation table applied to the PDSCH time domain resource allocation as a resource allocation table given by pdsch-TimeDomainAllocationList provided by pdsch-Config. In other words, in a case that pdsch-Config includes pdsch-TimeDomainAllocationList, the terminal apparatus 1 may use pdsch-TimeDomainAllocationList provided by pdsch-Config to be applied to the determination of the PDSCH time domain resource allocation regardless of whether pdsch-ConfigCommon includes pdsch-TimeDomainAllocationList. Further, in a case that pdsch-Config does not include pdsch-TimeDomainAllocationList and pdsch-ConfigCommon includes pdsch-TimeDomainAllocationList, the terminal apparatus 1 may determine the resource allocation table applied to the PDSCH time domain resource allocation as a resource allocation table given from pdsch-TimeDomainAllocationList provided by pdsch-ConfigCommon. In other words, the terminal apparatus 1 uses pdsch-TimeDomainAllocationList provided by pdsch-ConfigCommon to be applied to the determination of the PDSCH time domain resource allocation. Further, in a case that pdsch-Config does not include pdsch-TimeDomainAllocationList and pdsch-ConfigCommon does not include pdsch-TimeDomainAllocationList, the terminal apparatus 1 may determine the resource allocation table applied to the PDSCH time domain resource allocation as the default table A.

As seen from the examples B and C, the method for determining the resource allocation table applied to the PDSCH detected in the UE-specific search space is the same as the method for determining the resource allocation table applied to the PDSCH detected in any common search space that is not associated with CORESET #0.

The terminal apparatus 1 may determine the resource allocation table as shown in FIG. 9 in the last row of FIG. 8 (in a case that DCI is detected in any common search space or a UE-specific search space that is not associated with CORESET #0 and the RNTI is a predetermined type of RNTI). The terminal apparatus 1 may determine the resource allocation table applied to the PDSCH scheduled by DCI based on at least a part of the following elements from (G) to (I) in addition to a part or all of elements from (A) to (F).

Element (G): whether DCI is the above-mentioned first DCI (1st DCI) or second DCI (2nd DCI).

Element (H): whether pdsch-ConfigCommon includes pdsch-TimeDomainAllocationList2.

Element (I): whether pdsch-Config includes pdsch-TimeDomainAllocationList2.

However, the same default table (e.g., default table A) may be used in the case of the first DCI and in the case of the second DCI. However, pdsch-TimeDomainAllocationList2 may be a parameter that is not included in pdsch-ConfigCommon and/or may be a parameter that is included only in pdsch-Config.

In the table shown in FIG. 9, the terminal apparatus 1 and/or the base station apparatus 3 determine, based on the elements from (A) to (I), a resource allocation table to be applied to the PDSCH from the default table A, the default table D, pdsch-TimeDomainAllocationList included in pdsch-ConfigCommon, pdsch-TimeDomainAllocationList included in pdsch-Config, pdsch-TimeDomainAllocationList2 included in pdsch-ConfigCommon, and pdsch-TimeDomainAllocationList2 included in pdsch-Config.

In the table shown in FIG. 10, the terminal apparatus 1 and/or the base station apparatus 3 determine, based on the elements from (A) to (G) and element (I), a resource allocation table to be applied to the PDSCH from the default table A, pdsch-TimeDomainAllocationList included in pdsch-ConfigCommon, pdsch-TimeDomainAllocationList included in pdsch-Config, and pdsch-TimeDomainAllocationList2 included in pdsch-Config. In the example of the table shown in FIG. 10, when the DCI is the second DCI, pdsch-Config does not include pdsch-TimeDomainAllocationList2, and pdsch-ConfigCommon includes pdsch-TimeDomainAllocationList, the resource allocation table applied to the PDSCH is pdsch-TimeDomainAllocationList included in pdsch-ConfigCommon. However, when the DCI is the second DCI and pdsch-Config does not include pdsch-TimeDomainAllocationList2, the resource allocation table applied to the PDSCH may be the default table A or the default table D.

Then, the terminal apparatus 1 may select one PDSCH time domain resource allocation configuration in the determined resource allocation table based on a value indicated by a 'Time domain resource assignment' field included in the DCI that schedules the PDSCH. For example, when the resource allocation table applied to the PDSCH time domain resource allocation is the default table A, the value m indicated by the 'Time domain resource assignment' field may indicate the row index m+1 of the default table A. At this time, the PDSCH time domain resource allocation is a time domain resource allocation configuration indicated by the row index m+1. The terminal apparatus 1 receives the PDSCH assuming the time domain resource allocation configuration indicated by the row index m+1. For example, when the value m indicated by the 'Time domain resource assignment' field is 0, the terminal apparatus 1 uses the PDSCH time domain resource allocation configuration indicated by the row index 1 of the default table A to identify resource allocation of the PDSCH scheduled by the DCI in the time direction.

Further, when the resource allocation table applied to the PDSCH time domain resource allocation is a resource allocation table given by pdsch-TimeDomainAllocationList, the value m indicated by the 'Time domain resource assignment' field corresponds to the (m+1)th element (entry, row) in the list pdsch-TimeDomainAllocationList. For example, when the value m indicated by the 'Time domain resource assignment' field is 0, the terminal apparatus 1 may refer to the first element (entry) in the list pdsch-TimeDomainAllocationList. For example, when the value in indicated by the 'Time domain resource assignment' field is 1, the terminal apparatus 1 may refer to the second element (entry) in the list pdsch-TimeDomainAllocationList.

Further, when the resource allocation table applied to the PDSCH time domain resource allocation is a resource allocation table given by pdsch-TimeDomainAllocationList2, the value m indicated by the 'Time domain resource assignment' field corresponds to the (m+1)th element (entry, row) in the list pdsch-TimeDomainAllocationList2. For example, when the value in indicated by the 'Time domain resource assignment' field is 0, the terminal apparatus 1 may refer to the first element (entry) in the list pdsch-TimeDomainAllocationList2. For example, when the value m indicated by the 'Time domain resource assignment' field is 1, the terminal apparatus 1 may refer to the second element (entry) in the list pdsch-TimeDomainAllocationList2.

The number of bits (size) of the 'Time domain resource assignment' field included in DCI will be described below.

The terminal apparatus 1 may decode (receive) a corresponding PDSCH by detection of a PDCCH including DCI format 1_0, DCI format 1_1, or DCI format 1_2. The number of bits of the 'Time domain resource assignment' field included in DCI format 1_0 may be a fixed number of bits. For example, the fixed number of bits may be 4. In other words, the size of the 'Time domain resource assignment' field included in DCI format 1_0 is 4 bits. Further, the size of the 'Time domain resource assignment' field included in DCI format 1_1 and DCI format 1_2 may be a variable number of bits. For example, the number of bits of the 'Time domain resource assignment' field included in DCI format 1_1 and DCI format 1_2 may be any one of 0, 1, 2, 3 and 4.

Hereinafter, the determination of the number of bits of the 'Time domain resource assignment' field included in DCI format 1_1 and DCI format 1_2 will be described.

The number of bits of the 'Time domain resource assignment' field included in DCI format 1_1 and DCI format 1_2 may be given at least based on (I) whether pdsch-ConfigCommon includes pdsch-TimeDomainAllocationList (or pdsch-TimeDomainAllocationList2) and/or (II) whether pdsch-Config includes pdsch-TimeDomainAllocationList (or pdsch-TimeDomainAllocationList2) and/or (III) the number of rows included in a predefined default table. In the present invention, DCI format 1_1 and DCI format 1_2 are attached with a CRC scrambled by any one of a C-RNTI, an MCS-C-RNTI, and a CS-RNTI. DCI format 1_1 may be detected in a UE-specific search space. In the present invention, the meaning that 'pdsch-Config includes pdsch-TimeDomainAllocationList (or pdsch-TimeDomainAllocationList2)' may mean that 'pdsch-Config provides pdsch-TimeDomainAllocationList (or pdsch-TimeDomainAllocationList2)'. The meaning that 'pdsch-ConfigCommon includes pdsch-TimeDomainAllocationList (or pdsch-TimeDomainAllocationList2)' may mean that 'pdsch-ConfigCommon provides pdsch-TimeDomainAllocationList (or pdsch-TimeDomainAllocationList2)'.

The number of bits of the 'Time domain resource assignment' field may be given as ceiling($\log_2$(I)). The function ceiling(A) outputs a smallest integer that is not smaller than A. When pdsch-TimeDomainAllocationList (or pdsch-TimeDomainAllocationList2) is configured (provided) for the terminal apparatus 1, the value of I may be the number of entries included in pdsch-TimeDomainAllocationList (or pdsch-TimeDomainAllocationList2). When pdsch-TimeDomainAllocationList (or pdsch-TimeDomainAllocationList2) is not configured (provided) for the terminal apparatus 1, the value of I may be the number of rows in a default table (default table A (or default table D)). In other words, when pdsch-TimeDomainAllocationList (or pdsch-TimeDomainAllocationList2) is configured for the terminal apparatus 1, the number of bits of the 'Time domain resource assignment' field may be given based on the number of entries included in pdsch-TimeDomainAllocationList (or pdsch-TimeDomainAllocationList2). When pdsch-TimeDomainAllocationList (or pdsch-TimeDomainAllocationList2) is not configured for the terminal apparatus 1, the number of bits of the 'Time domain resource assignment' field may be given based on the number of rows in a default table (default table A). Specifically, in a case that pdsch-Config includes pdsch-TimeDomainAllocationList (or pdsch-TimeDomainAllocationList2), the value of I may be the number of entries included in pdsch-TimeDomainAllocationList (or pdsch-TimeDomainAllocationList2) provided by pdsch-Config. Further, in a case that pdsch-Config does not include pdsch-TimeDomainAllocationList (or pdsch-TimeDomainAllocationList2) and pdsch-ConfigCommon includes pdsch-TimeDomainAllocationList (or pdsch-TimeDomainAllocationList2), the value of I may be the number of entries included in pdsch-TimeDomainAllocationList (or pdsch-TimeDomainAllocationList2) provided by pdsch-ConfigCommon. Further, in a case that pdsch-Config does not include pdsch-TimeDomainAllocationList (or pdsch-TimeDomainAllocationList2) and pdsch-ConfigCommon does not include pdsch-TimeDomainAllocationList (or pdsch-TimeDomainAllocationList2), the value of I may be the number of rows included in a default table (e.g., default table A or default table D).

Further, in other words, when pdsch-TimeDomainAllocationList (or pdsch-TimeDomainAllocationList2) is configured (provided) for the terminal apparatus 1, the number of bits of the 'Time domain resource assignment' field may also be given as ceiling($\log_2$(I)). When pdsch-TimeDomainAllocationList (or pdsch-TimeDomainAllocationList2) is not configured (provided) for the terminal apparatus 1, the number of bits of the 'Time domain resource assignment' field may be a fixed number of bits. For example, the fixed number of bits may be 4 bits. Here, I may be the number of entries included in pdsch-TimeDomainAllocationList (or pdsch-TimeDomainAllocationList2). Specifically, in a case that pdsch-Config includes pdsch-TimeDomainAllocationList (or pdsch-TimeDomainAllocationList2), the value of I may be the number of entries included in pdsch-TimeDomainAllocationList (or pdsch-TimeDomainAllocationList2) provided by pdsch-Config. Further, in a case that pdsch-Config does not include pdsch-TimeDomainAllocationList (or pdsch-TimeDomainAllocationList2) and pdsch-ConfigCommon includes pdsch-TimeDomainAllocationList (or pdsch-TimeDomainAllocationList2), the value of I may be the number of entries included in pdsch-TimeDomainAllocationList (or pdsch-TimeDomainAllocationList2) provided by pdsch-ConfigCommon.

As a result, the terminal apparatus 1 can identify the number of bits of the 'Time domain resource assignment' field generated by the base station apparatus 3. In other words, the terminal apparatus 1 can correctly receive the PDSCH that is scheduled by the base station apparatus 3 for the terminal apparatus 1.

Hereinafter, a procedure for receiving the PUSCH will be described.

The terminal apparatus 1 may transmit a corresponding PUSCH by detection of a PDCCH including DCI format 0_0, DCI format 0_1, or DCI format 0_2. In other words, the corresponding PUSCH may be scheduled (indicated) by the DCI format (DCI). Further, the PUSCH may also be scheduled by an RAR UL grant included in an RAR message. The starting position (starting symbol) of the scheduled PUSCH is referred to as S. The starting symbol S of the PUSCH may be the first symbol with which the PUSCH is transmitted (mapped) in a certain slot. The starting symbol S indicates what number of a symbol from the start of the slot. For example, when the value of S is 0, the terminal apparatus 1 may transmit the PUSCH from the first symbol in a certain slot. Further, for example, when the value of S is 2, the terminal apparatus 1 may transmit the PUSCH from the third symbol in a certain slot. The number of consecutive symbols of the scheduled PUSCH is referred to as L. The number of consecutive symbols L is counted from the starting symbol S. The determination of S and L assigned to the PUSCH will be described later.

The PUSCH mapping types have a PUSCH mapping type A and a PUSCH mapping type B. In the PUSCH mapping type A, the value of S is 0. L takes a value from 4 to 14. However, the sum of S and L takes a value from 4 to 14. In the PUSCH mapping type B, S takes a value from 0 to 13. L takes a value from 1 to 14. The sum of S and L may be limited to a value between 1 and 14. However, the sum of S and L may not be limited under a predetermined condition. For example, when a certain higher layer parameter is configured, the sum of S and L is not limited, and when the certain higher layer parameter is not configured, the sum of S and L may be limited. However, when a certain higher layer parameter is configured, a different mapping type (for example, PUSCH mapping type C) may be configured instead of the PUSCH mapping type B. Similar to the PUSCH mapping type B, the PUSCH mapping type C may be a mapping type corresponding to allocation in a mini-slot unit.

The position of a DMRS symbol for the PUSCH depends on the PUSCH mapping type. The position of a first DMRS symbol for the PUSCH depends on the PUSCH mapping type. In the PUSCH mapping type A, the position of the first DMRS symbol may be indicated by a higher layer parameter dmrs-TypeA-Position. dmrs-TypeA-Position is set to either 'pos2' or 'pos3'. For example, when dmrs-TypeA-Position is set to 'pos2', the position of the first DMRS symbol for the PUSCH may be the third symbol in a slot. For example, when dmrs-TypeA-Position is set to 'pos3', the position of the first DMRS symbol for the PUSCH may be the fourth symbol in a slot. In the PUTSCH mapping type B and the PUSCH mapping type C, the position of the first DMRS symbol may be the first symbol of an allocated PUSCH.

Hereinafter, a method for identifying PUTSCH time domain resource allocation will be described.

The base station apparatus 3 may schedule the terminal apparatus 1 to transmit the PUSCH by DCI. In addition, the terminal apparatus 1 may transmit the PUSCH by detection of DCI addressed to the apparatus itself. When identifying PUSCH time domain resource allocation, the terminal apparatus 1 determines a resource allocation table to be applied to the PUSCH. The resource allocation table includes one or more PUSCH time domain resource allocation configurations. The terminal apparatus 1 may select one PUSCH time domain resource allocation configuration in the determined resource allocation table based on a value indicated by a 'Time domain resource assignment' field included in the DCI that schedules the PUSCH. In other words, the base station apparatus 3 determines PUSCH resource allocation for the terminal apparatus 1, generates a value of the 'Time domain resource assignment' field, and transmits the DCI including the 'Time domain resource assignment' field to the terminal apparatus 1. The terminal apparatus 1 identifies PUSCH time domain resource allocation based on the value set in the 'Time domain resource assignment' field.

FIG. 15 is an example of a table illustrating a method for determining a resource allocation table applied to a PUSCH according to an embodiment of the present invention. FIG. 16 is another example of a table illustrating a method for determining a resource allocation table applied to a PUSCH according to an embodiment of the present invention. FIG. 15 and FIG. 16 are tables that define selection rules for a resource allocation table applied to PUTSCH time domain resource allocation. Whether to use the table shown in FIG. 15 or the table shown in FIG. 16 may be determined/selected based on a higher layer parameter, DCI, and/or RNTI. For example, when a higher layer parameter punch-tdra-r16 is configured, the table shown in FIG. 16 may be used to determine/select the resource allocation table to be applied to the PUSCH time domain resource allocation, and when the higher layer parameter pusch-tdra-r16 is not configured, the table shown in FIG. 15 may be used to determine/select the resource allocation table to be applied to the PUSCH time domain resource allocation. However, the tables of FIG. 15 and FIG. 16 may be combined into one table. The terminal apparatus 1 may determine/select a resource allocation table to be applied to the PUSCH time domain resource allocation based on a RNTI, a PDCCH search space, presence/absence of a predetermined higher layer parameter pusch-TimeDomainAllocationList or pusch-TimeDomainAllocationList2 and/or configuration or presence/absence of a higher layer parameter pusch-tdra-r16. The resource allocation table includes one or more PUSCH time domain resource allocation configurations. In the present invention, the resource allocation tables are categorized into (I) a predefined resource allocation table and (II) a resource allocation table configured from a higher layer RRC signal. The predefined resource allocation table is defined as a default PUSCH time domain resource allocation A, and/or a default PUSCH time domain resource allocation B. Hereinafter, the default PUSCH time domain resource allocation A is referred to as a PUSCH default table A, and the default PUSCH time domain resource allocation B is referred to as a PUSCH default table B.

FIG. 17 is a diagram illustrating an example of a PUSCH default table A for an NCP according to an embodiment of the present invention. In FIG. 17, the number of rows in the PUSCH default table A is 16, and each row indicates PUSCH time domain resource allocation configurations. In FIG. 17, the indexed row defines a PUSCH mapping, type, a slot offset $K_2$ between a PDCCH including DCI and a PUSCH, the starting symbol S of the PUSCH within a slot, and the number of consecutively allocated symbols L. FIG. 18 is a diagram illustrating an example of a PUSCH default table B for an NCP according to an embodiment of the present invention. In FIG. 18, the number of rows in the PUDSCH default table B is 16, and each row indicates PUSCH time domain resource allocation configurations. In FIG. 18, the indexed row defines a PUSCH mapping type, a slot offset $K_2$ between a PDCCH including DCI and a PUSCH, the starting symbol S of the PUSCH within a slot, the number of consecutively allocated symbols L, and/or the number of repetitive transmissions Rep of the PUSCH. However, the number of rows in the PUSCH default table A and/or the PUSCH default table B may not have to be 16. For example, the number of rows in the PUSCH default table A and the number of rows in the PUSCH default table B may be different values. In other words, the terminal apparatus 1 may use a PUSCH default table with a different number of rows according to the configuration of the higher layer parameter, information included in the DCI field, and/or the RNTI. For example, the terminal apparatus 1 may use a PUSCH default table with a different number of rows according to the number of bits constituting a time domain resource allocation field indicated by the DCI. However, the columns constituting the PUSCH default table A and the columns constituting the PUSCH default table B may be different. For example, any one of the indexed rows, the PUSCH mapping type, the offset $K_2$, the starting symbol S, and the number of symbols L indicated in the PUSCH default table A may not be indicated in the PUSCH default table B, and conversely, other columns may be indicated only in the PUSCH default table B.

The resource allocation table configured from the higher layer RRC signal is given by the higher layer signal pusch-TimeDomainAllocationList. The information element PUSCH-TimeDomainResourceAllocation indicates the PUSCH time domain resource allocation configuration. PUSCH-TimeDomainResourceAllocation may be used to configure a time domain relationship between the PDCCH including DCI and the PUSCH. pusch-TimeDomainAllocationList includes one or more information elements PUSCH-TimeDomainResourceAllocation. In other words, pusch-TimeDomainAllocationList is a list that includes one or more elements (information elements). One information element PUSCH-TimeDomainResourceAllocation may also be referred to as one entry (or one row). FIG. 19 is a diagram illustrating an example of a parameter configuration of an RRC parameter PUSCH-TimeDomainResourceAllocation according to an embodiment of the present invention (i.e., a parameter configuration of each entry). Each entry may be defined by k2, mappingType, and startSymbolAndLength. k2 indicates a slot offset between a PDCCH including DCI and a scheduled PUSCH. If PUSCH-TimeDomainResourceAllocation does not indicate k2, the terminal apparatus 1 may assume that the value of k2 is a predetermined value according to the subcarrier spacing used for transmission of the PUSCH. For example, the terminal apparatus 1 may assume that the value of k2 is 1 when the subcarrier spacing of the PUSCH is 15 kHz or 30 kHz, assume that the value of k2 is 2 when the subcarrier spacing of the PUSCH is 60 kHz, and assume that the value of k2 is 3 when the subcarrier spacing of the PUSCH is 120 kHz. mappingType indicates either the PUSCH mapping type A or the PUSCH mapping type B. startSymbolAndLength is an index that gives a valid combination of the starting symbol S of the PUSCH and the number of consecutively allocated symbols L. startSymbolAndLength may be referred to as a start and length indicator SLIV. In other words, unlike a default table that directly defines the starting symbol S and the consecutive symbols L, the starting symbol S and the consecutive symbols L are given based on the SLIV. The base station apparatus 3 can set the value of the SLIV so that the PUSCH time domain resource allocation does not exceed a slot boundary. As illustrated in the equation in FIG. 14, the value of the SLIV is calculated based on the number of symbols included in a slot, the starting symbol S, and the number of consecutive symbols L.

The resource allocation table configured from the higher layer RRC signal is given by the higher layer signal pusch-TimeDomainAllocationList. pusch-TimeDomainAllocationList2 and punch-TimeDomainAllocationList may be different parameters. An information element PUSCH-TimeDomainResourceAllocation2 indicates the PUSCH time domain resource allocation configuration, PUSCH-TimeDomainResourceAllocation2 may be used to configure a time domain relationship between the PDCCH including DCI and the PUSCH. pusch-TimeDomainAllocationList2 includes one or more information elements PUSCH-TimeDomainResourceAllocation2. In other words, pusch-TimeDomainAllocationList2 is a list that includes one or more elements (information elements). One information element PDSCH-TimeDomainResourceAllocation2 may also be referred to as one entry (or one row).

FIG. 20 is a diagram illustrating an example of parameter configuration of an RRC parameter PUSCH-TimeDomainResourceAllocation2 according to an embodiment of the present invention (i.e., a parameter configuration of each entry). Each entry may be defined by k2, mappingType, startSymbol, length and/or repetition. k2 indicates a slot offset between a PDCCH including DCI and a scheduled PUSCH. If k2 is not provided (not present/absent) to PUSCH-TimeDomainResourceAllocation2, the terminal apparatus 1 may assume that the value of k2 is a predetermined value according to the subcarrier spacing used for transmission of the PUSCH. For example, the terminal apparatus 1 may assume that the value of k2 is 1 when the subcarrier spacing of the PUSCH is 15 kHz or 30 kHz, assume that the value of k2 is 2 when the subcarrier spacing of the PUSCH is 60 kHz, and assume that the value of k2 is 3 when the subcarrier spacing of the PUSCH is 120 kHz. mappingType indicates a PUSCH mapping type. For example, mappingType indicates either a PUSCH mapping type A or a PUSCH mapping type B. startSymbol indicates the starting symbol S of the PUSCH. For example, startSymbol indicates an integer from 0 to 13. The length indicates the length of the PUSCH, i.e., the number of consecutively allocated symbols L. For example, L indicates any one of a plurality of integer values. However, L indicated by length may be the number of symbols virtually and consecutively allocated to unavailable symbols for the PUSCH, and the symbols actually used for the PUSCH and the value of L may be different. However, L indicated by length may be the number of symbols consecutively allocated to available uplink symbols for the PUSCH. The repetition indicates the number of repetitive transmissions of the PUSCH. For example, repetition may indicate any one of integers from 2 to 8. However, when repetition is not provided (not present/absent) to PUSCH-TimeDomainResourceAllocation2, the terminal apparatus 1 may assume that the value of repetition is 1 (that is, the number of repetitive transmissions of the PUSCH is 1). However, when repetition is not provided to PUSCH-TimeDomainResourceAllocation2, the terminal apparatus 1 may select/determine the number of repetitive transmissions based on the value of a higher layer parameter repetitionCommon. However, the higher layer parameter repetitionCommon indicates the number of repetitive transmissions of the PUSCH, which is commonly used for all entries. However, when repetition is not provided to PUSCH-TimeDomainResourceAllocation2 and the higher layer parameter repetitionCommon is not provided/configured, the terminal apparatus 1 may assume that the value of repetition is 1 (that is, the number of repetitive transmissions of the PUSCH is 1). However, the value(s) of startSymbol, length and/or repetition may be given by one parameter using joint coding. For example, a value excluding a combination of unused startSymbol, length, and/or repetition may be used as a candidate parameter for a reason such as a positional relationship between a slot boundary and a PUSCH.

The higher layer signals pusch-TimeDomainAllocationList and pusch-TimeDomainAllocationList2 may be included in a cell-specific RRC parameter pusch-ConfigCommon and/or a terminal apparatus 1 (UE) specific RRC parameter pusch-Config. pusch-ConfigCommon is used to configure a cell-specific parameter for a PUSCH for a certain BWP. pusch-Config is used to configure a terminal apparatus 1 (UE) specific parameter for a PUSCH for a certain BWP. However, the terminal apparatus 1 may determine whether the resource allocation table used for the PUSCH time domain resource allocation is given by pusch-TimeDomainAllocationList or given by pusch-TimeDomainAllocationList2 based on the higher layer parameter, the DCI and/or the RNTI. However, the terminal apparatus 1 may determine whether each entry in pusch-TimeDomainAllocationList or pusch-TimeDomainAllocationList2 is given by PUSCH-TimeDomainResourceAllocation or given by PUSCH-TimeDomainResourceAllocation2 based on the higher layer parameter, the DCI and/or the RNTI.

The terminal apparatus 1 detects DCI that schedules the PUSCH. The slots in which the PUSCH is transmitted are given by $\text{floor}(n*2^{\mu PUSCH}/2^{\mu PDCCH})+K_2$ (Equation 4). n is a slot in which the PDCCH that schedules the PUSCH is detected. μPUSCH is a subcarrier spacing configuration for the PUSCH. μPDCCH is a subcarrier spacing configuration for the PDCCH.

In FIG. 17 and FIG. 18, the value of $K_2$ is any one of j, j+1, j+2, and j+3. The value of j is a value identified for subcarrier spacing of the PUSCH. For example, when the subcarrier spacing to which the PUSCH is applied is 15 kHz or 30 kHz, the value of j may be one slot. For example, when the subcarrier spacing to which the PUSCH is applied is 60 kHz, the value of j may be two slots. For example, when the subcarrier spacing to which the PUSCH is applied is 120 kHz, the value of j may be three slots.

As described above, the terminal apparatus 1 may determine which resource allocation table to be applied to the PUSCH time domain resource allocation based on the table as shown in FIG. 16.

As an example D, the terminal apparatus 1 may determine a resource allocation table to be applied to the PUSCH scheduled by an RAR UL, grant. In a case that pusch-ConfigCommon includes pusch-TimeDomainAllocationList2 for the terminal apparatus 1, the terminal apparatus 1 may determine the resource allocation table configured from a higher layer RRC signal. The resource allocation table is given by pusch-TimeDomainAllocationList2 included in pusch-ConfigCommon. Further, in a case that pusch-ConfigCommon does not include pusch-TimeDomainAllocationList2 for the terminal apparatus 1, the terminal apparatus 1 may determine a PUSCH default table B. In other words, the terminal apparatus 1 may use the default table B, which indicates the PUSCH time domain resource allocation configuration, to be applied to the determination of the PUSCH time domain resource allocation.

As an example E, the terminal apparatus 1 may detect DCI in any common search space associated with CORESET #0. The detected DCI is attached with a CRC scrambled by any one of a C-RNTI, an MCS-C-RNTI, a TC-RNTI, and a CS-INTI. In addition, the terminal apparatus 1 may determine a resource allocation table to be applied to the PUSCH scheduled by the DCI. In a case that pusch-ConfigCommon includes pusch-TimeDomainAllocationList2 for the terminal apparatus 1, the terminal apparatus 1 may determine the resource allocation table applied to the PUSCH time domain resource allocation as a resource allocation table given by pusch-TimeDomainAllocationList2 provided by pdsch-ConfigCommon. Further, in a case that pusch-ConfigCommon does not include pusch-TimeDomainAllocationList2, the terminal apparatus 1 may determine the resource allocation table applied to the PUSCH time domain resource allocation as a PUSCH default table B.

As an example F, the terminal apparatus 1 may detect DCI in (I) any common search space associated with CORESET #0 or (II) a UE-specific search space. The detected DCI is attached with a CRC scrambled by any one of a C-RNTI, an MCS-C-RNTI, a TC-RNTI, and a CS-RNTI. In addition, the terminal apparatus 1 may determine a resource allocation table to be applied to the PUSCH scheduled by the DCI. In a case that pusch-Config includes pusch-TimeDomainAllocationList2 for the terminal apparatus 1, the terminal apparatus 1 may determine the resource allocation table applied to the PUSCH time domain resource allocation as a resource allocation table given by pusch-TimeDomainAllocationList2 provided by pusch-Config. In other words, in a case that pusch-Config includes pusch-TimeDomainAllocationList2, the terminal apparatus 1 may use pusch-TimeDomainAllocationList2 provided by pusch-Config to be applied to the determination of the PUSCH time domain resource allocation regardless of whether pusch-ConfigCommon includes pusch-TimeDomainAllocationList2. Further, in a case that pusch-Config does not include pusch-TimeDomainAllocationList2 and pusch-ConfigCommon includes pusch-TimeDomainAllocationList2, the terminal apparatus 1 may determine the resource allocation table applied to the PUSCH time domain resource allocation as a resource allocation table given from pusch-TimeDomainAllocationList2 provided by pusch-ConfigCommon. In other words, the terminal apparatus 1 uses pusch-TimeDomainAllocationList2 provided by pusch-ConfigCommon to be applied to the determination of the PUSCH time domain resource allocation. Further, in a case that pusch-Config does not include pusch-TimeDomainAllocationList2 and pusch-ConfigCommon does not include pusch-TimeDomainAllocationList2, the terminal apparatus 1 may determine the resource allocation table applied to the PUSCH time domain resource allocation as a PUSCH default table B.

The terminal apparatus 1 may select one PUSCH time domain resource allocation configuration in the determined resource allocation table based on a value indicated by a 'Time domain resource assignment' field included in the DCI that schedules the PUSCH. For example, when the resource allocation table applied to the PUSCH time domain resource allocation is the PUSCH default table A (or PUSCH default table B), the value m indicated by the 'Time domain resource assignment' field may indicate the row index m+1 of the PUSCH default table A (or PUSCH default table B). At this time, the PUSCH time domain resource allocation is a time domain resource allocation configuration indicated by the row index m+1. The terminal apparatus 1 transmits the PUSCH assuming the time domain resource allocation configuration indicated by the row index m+1. For example, when the value m indicated by the 'Time domain resource assignment' field is 0, the terminal apparatus 1 uses the PUSCH time domain resource allocation configuration indicated by the row index 1 of the PUSCH default table A (or PUSCH default table B) to identify resource allocation of the PUSCH scheduled by the DCI in the time direction.

Further, when the resource allocation table applied to the PUSCH time domain resource allocation is a resource allocation table given by pusch-TimeDomainAllocationList, the value m indicated by the 'Time domain resource assignment' field corresponds to the (m+1)th element (entry, row) in the list pusch-TimeDomainAllocationList. For example, when the value m indicated by the 'Time domain resource assignment' field is 0, the terminal apparatus 1 may refer to the first element (entry) in the list pusch-TimeDomainAllocationList. For example, when the value m indicated by the 'Time domain resource assignment' field is 1, the terminal apparatus 1 may refer to the second element (entry) in the list pusch-TimeDomainAllocationList.

Further, when the resource allocation table applied to the PUSCH time domain resource allocation is a resource allocation table given by pusch-TimeDomainAllocationList2, the value m indicated by the 'Time domain resource assignment' field corresponds to the (m+1)th element (entry, row) in the list pusch-TimeDomainAllocationList2. For example, when the value in indicated by the 'Time domain resource assignment' field is 0, the terminal apparatus 1 may refer to the first element (entry) in the list pusch-TimeDomainAllocationList2. For example, when the value m indicated by the 'Time domain resource assignment' field is 1, the terminal apparatus 1 may refer to the second element (entry) in the list pusch-TimeDomainAllocationList2.

The number of bits (size) of the 'Time domain resource assignment' field included in DCI will be described below.

The terminal apparatus 1 may transmit a corresponding PUSCH by detection of a PDCCH including DCI format 0_0, DCI format 0_1, or DCI format 0_2. The number of bits of the 'Time domain resource assignment' field included in DCI format 0_0 may be a fixed number of bits. For example, the fixed number of bits may be 6. In other words, the size of the 'Time domain resource assignment' field included in DCI format 0_0 is 6 bits. Further, the size of the 'Time domain resource assignment' field included in DCI format 0_1 or DCI format 0_2 may be a variable number of bits. For example, the number of bits of the 'Time domain resource assignment' field included in DCI format 0_1 or DCI format 0_2 may be any one of 0, 1, 2, 3, 4, 5, and 6.

Hereinafter, the determination of the number of bits of the 'Time domain resource assignment' field included in DCI format 0_1 or DCI format 0_2 will be described.

The number of bits of the 'Time domain resource assignment' field may be given as ceiling($\log_2(I)$). When pusch-TimeDomainAllocationList (or pusch-TimeDomainAllocationList2) is configured (provided) for the terminal apparatus 1, the value of I may be the number of entries included in pusch-TimeDomainAllocationList (or pusch-TimeDomainAllocationList2). When pusch-TimeDomainAllocationList (or pusch-TimeDomainAllocationList2) is not configured (provided) for the terminal apparatus 1, the value of I may be the number of rows in a PUSCH default table A (or PUSCH default table B). In other words, when pusch-TimeDomainAllocationList (or pusch-TimeDomainAllocationList2) is configured for the terminal apparatus 1, the number of bits of the 'Time domain resource assignment' field may be given based on the number of entries included in pusch-TimeDomainAllocationList (or pusch- TimeDomainAllocationList2). When pusch-TimeDomain-AllocationList (or pusch-TimeDomainAllocationList2) is not configured for the terminal apparatus 1, the number of bits of the 'Time domain resource assignment' field may be given based on the number of rows in a default table (PUSCH default table A or PUSCH default table B). Specifically, in a case that pusch-Config includes pusch-Time-DomainAllocationList (or pusch-TimeDomainAllocation-List2), the value of I may be the number of entries included in pusch-TimeDomainAllocationList (or pusch-TimeDomainAllocationList2) provided by pusch-Config. Further, in a case that pusch-Config does not include pusch-TimeDomainAllocationList (or pusch-TimeDomainAllocationList2) and pusch-ConfigCommon includes pusch-TimeDomainAllocationList (or pusch-TimeDomainAllocationList2), the value of I may be the number of entries included in pusch-TimeDomainAllocationList (or pusch-TimeDomainAllocationList2) provided by pusch-ConfigCommon. Further, in a case that pusch-Config does not include pusch-TimeDomainAllocationList (or pusch-TimeDomainAllocationList2) and pusch-ConfigCommon does not include pusch-TimeDomainAllocationList (or pusch-TimeDomainAllocation-List2), the value of I may be the number of rows included in a PUSCH default table A (or PUSCH default table B).

Hereinafter, the repetitive transmission (also referred to as repetition, repetition transmission, or aggregation transmission) of the PUSCH in the present invention will be described. The repetitive transmission of the PUSCH in the present invention is a repetitive transmission that transmits a plurality of PUSCHs consecutively to one or a plurality of slots by one uplink grant, and is referred to as mini-slot level repetitive transmission (mini-slot repetition) or multi-segment transmission. In other words, the terminal apparatus 1 may repeatedly transmit the PUSCH a plurality of times in the same slot.

The terminal apparatus 1 repeatedly transmits the PUSCH with the time resource determined based on a higher layer parameter indicated by an RRC message (for example, the above-mentioned pusch-TimeDomainAllocationList2), and the starting symbol S, the transmission period L of the PUSCH, and/or the number of repetitive transmissions Rep of the time domain resources for the PUSCH that are given by a field of downlink control information received by a PDCCH (for example, the above-mentioned 'Time domain resource assignment' field). In other words, the terminal apparatus 1 may determine an actual starting symbol, an actual period and/or an actual number of repetitive transmissions of each PUSCH to be repeatedly transmitted from the higher layer parameter indicated by the RRC message and from S, L, and/or Rep given by the field of downlink control information to be received by the PDCCH. However, S, L, and/or Rep may be a nominal starting symbol, a nominal transmission period, and/or a nominal number of repetitive transmissions, respectively. For example, S, L, and/or Rep may be different from a starting symbol, a transmission period, and/or a number of repetitive transmissions used for transmission of an actual PUSCH, respectively. The terminal apparatus 1 may determine an actual starting symbol, an actual period and/or an actual number of repetitive transmissions of each PUSCH to be repeatedly transmitted from the higher layer parameter indicated by the RRC message and from the starting symbol S, L (nominal period), and/or Rep (nominal number of repetitive transmissions) of the time domain resources for the PUSCH that are given by the field of downlink control information to be received by the PDCCH, and from a boundary position of the slot and/or arrangement of uplink symbols available for transmitting the PUSCH.

Figure 21:
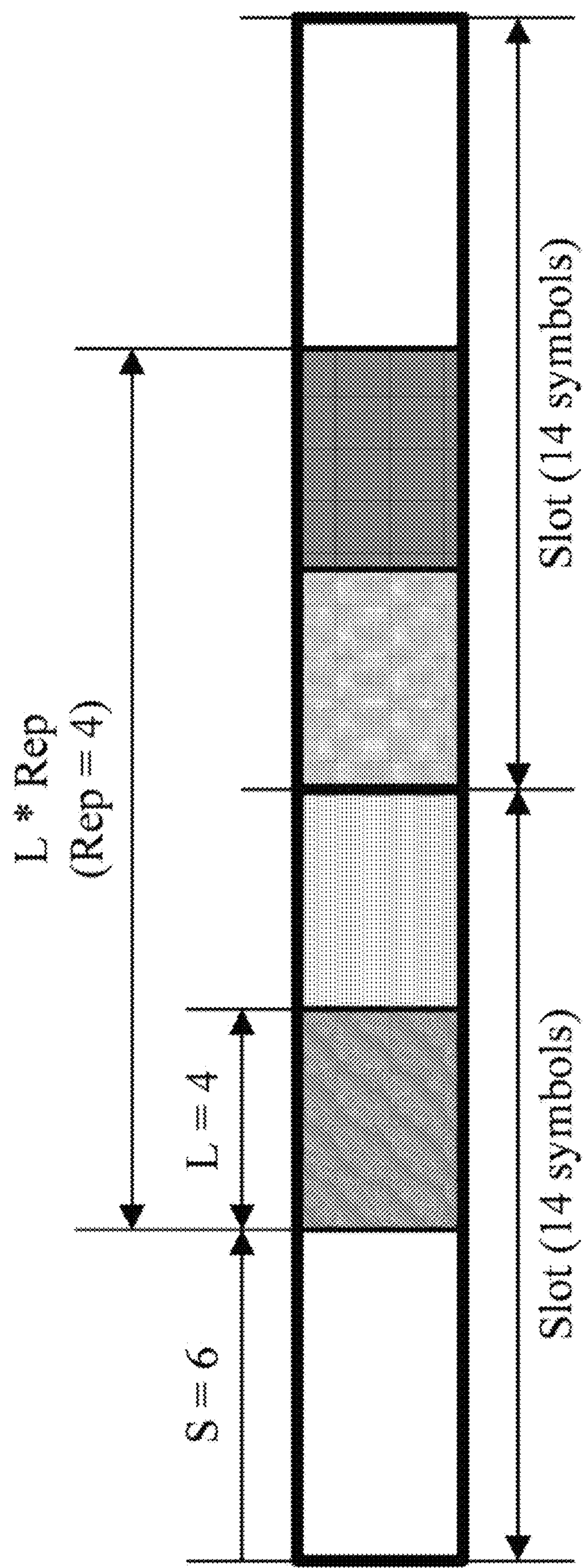
FIG. 21 is a diagram illustrating an example of repetitive transmission of a PUSCH according to an embodiment of the present invention.

FIG. 21 is a diagram illustrating an example of repetitive transmission of a PUSCH according to an embodiment of the present invention. FIG. 21 illustrates a case where S=6, L=4, and Rep=4 are indicated by the higher layer parameter and the downlink control information, and a PUSCH is repeatedly transmitted four times for two consecutive slots where the starting symbol is the 7th symbol in the slot and the duration is four symbols.

In the case that S, L, and Rep are given to the terminal apparatus, the terminal apparatus 1 identifies the time domain resource used for repetitive transmission of the PUSCH based on these parameters. The terminal apparatus 1 may repeatedly transmit the PUSCH by using (L×Rep) symbols from the starting symbol S. However, when a part of symbols of the L×Rep symbols are symbols for downlink or symbols that cannot be used for transmission of the PUSCH, the terminal apparatus 1 may drop the PUSCH corresponding to the part of symbols. For example, when one slot includes 14 symbols, S=2, L=4, Rep=2, and the symbol numbers 6 and 7 in the slot are symbols that cannot be used for transmission of the PUSCH, the terminal apparatus 1 may transmit a first PUSCH with four symbols from symbol numbers 2 to 5 and transmit a second PUSCH with two symbols from symbol numbers 8 to 9 with symbol numbers 6 and 7 dropped. However, the terminal apparatus 1 may repeatedly transmit the PUSCH, from the starting symbol 5, by using (L×Rep) consecutive symbols as the symbols that can be used for the transmission of the PUSCH, For example, when one slot includes 14 symbols, S=2, L=4, Rep=2, and the symbol numbers 6 and 7 in the slot are symbols that cannot be used for transmission of the PUSCH, the terminal apparatus 1 may transmit a first PUSCH with four symbols from symbol numbers 2 to 5 and transmit a second PUSCH with four symbols from symbol numbers 8 to 11.

Figure 22:
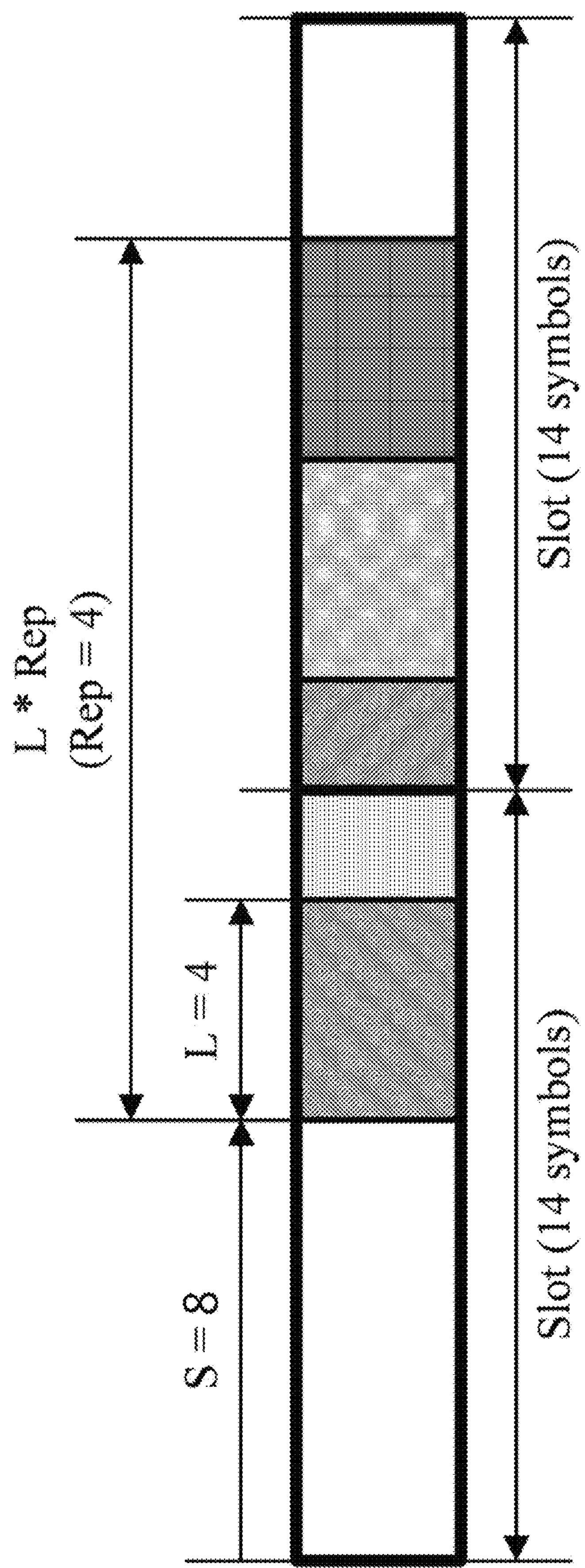
FIG. 22 is a diagram illustrating another example of repetitive transmission of a PUSCH according to an embodiment of the present invention.

FIG. 22 is a diagram illustrating another example of repetitive transmission of a PUSCH according to an embodiment of the present invention. In a case that a slot boundary is crossed within any one of L symbols of the PUSCH that is transmitted once or a plurality of times, or in a case that a part of the symbols is a downlink symbol, the terminal apparatus 1 may segment the PUSCH as a plurality of PUSCHs to be transmitted. FIG. 22 illustrates a case of S=8, L=4 and Rep=4 as an example. In this case, the parameter configuration is for repeating four times the PUTSCH with a period of 4 symbols from the 9th symbol in the slot, but since the second PUSCH of the repetitive transmissions crosses the slot boundary, the second PUSCH is segmented into PUSCHs with 2 periods each having 2 symbols. As a result, each PUSCH does not cross the slot boundary, and the PUSCH with a period of 4 symbols or 2 symbols is transmitted five times. In other words, Rep indicated by a higher layer parameter and the number of repetitive transmissions of the actually transmitted PUSCH may be different. In other words. L indicated by a higher layer parameter and the number of symbols of the actually transmitted PUSCH may be different. For example, the terminal apparatus 1 may determine the actual number of repetitive transmissions of the PUSCH from Rep and the number of segments of each PUSCH. For example, in a case that Rep (nominal number of repetitions) indicated by the RRC message and/or DCI is 1, or in a case that the time domain resource of the PUSCH determined by S and L crosses the slot boundary, or in a case that a part of the symbols is not available for transmission of the PUSCH, the terminal apparatus 1 may repeatedly transmit the PUSCH with a plurality of segmented time domain resources. More specifically, in a case that one slot includes 14 symbols and S=8, L=14, Rep=1 are notified, the terminal apparatus may transmit one PUSCH with six symbols from the symbol numbers 8 to 13 in a first slot and may transmit the other PUSCH with eight symbols from the symbol numbers 0 to 7 in a second slot. In this case, the terminal apparatus 1 may perform two repetitive transmissions of the PUSCH by using the time domain resource of 6 symbols from the symbol number 8 in the first slot and the time domain resource of 8 symbols from the symbol number 0 in the second slot.

However, in a case that the time domain resource of the L×Rep symbols indicated by S, L, and Rep crosses the slot boundary, or in a case that a part of the symbols is a DL symbol, the terminal apparatus 1 may segment the time domain resource and transmit one PUSCH for each group of consecutive available uplink symbols in the slot. In other words, in a case that the time domain resource of the L×Rep symbols indicated by S, L, and Rep crosses the slot boundary, or in a case that a part of the symbols is a DL symbol, the terminal apparatus 1 does not need to transmit a plurality of PUSCHs within a group of consecutive available uplink symbols in the slot.

In the present invention, the terminal apparatus 1 may determine whether to apply the repetitive transmission to the transmission of the PUSCH scheduled by the uplink grant or determine which of a plurality of repetitive transmission types is applied at least based on (I) a higher layer parameter and/or (II) a field included in the uplink grant. In addition to the repetitive transmission transmitted by the consecutive available uplink symbols of one or more consecutive available slots (hereinafter referred to as a first repetitive transmission) as described above, the repetitive transmission types may include slot aggregation in which a PUSCH is transmitted once per slot with the same defined symbols between slots (hereinafter referred to as a second repetitive transmission).

In aspect A of the present invention, the base station apparatus 3 may notify the terminal apparatus 1 of which of the first repetitive transmission and the second repetitive transmission is to be configured/applied by a higher layer parameter. For example, pusch-AggregationFactor may be used to indicate the number of repetitive transmissions of the second repetitive transmission. For example, push-AggressionFactor-r16 may be used to indicate the number of repetitive transmissions of the first repetitive transmission that is common among indexes notified in the 'Time domain resource assignment' field of DCI. For example, repetition may be used to indicate the number of repetitive transmissions of the first repetitive transmission of each index notified in the 'Time domain resource assignment' field of DCI. In a case that pusch-AggregationFactor, pusch-AggregationFactor-r16, and repetition are not configured in the terminal apparatus 1, the terminal apparatus 1 may consider that the repetitive transmission is not applied and transmit the PUSCH scheduled by an uplink grant once.

Further, as an example, the terminal apparatus 1 may determine which of the first repetitive transmission and the second repetitive transmission is applied based on the 'Time domain resource assignment' field included in the uplink grant transmitted from the base station apparatus 3. As described above, the 'Time domain resource assignment' field is used to indicate the PUSCH time domain resource allocation.

In aspect C of the present invention, the base station apparatus 3 may notify the terminal apparatus 1 of which of the first repetitive transmission and the second repetitive transmission is to be configured by a higher layer parameter. For example, the base station apparatus 3 may configure a higher layer parameter indicating the number of repetitive transmissions for each of the first repetitive transmission and the second repetitive transmission, respectively. For example, pusch-AggregationFactor-r16 and/or repetition may be used to indicate the number of repetitive transmissions of the first repetitive transmission.

Further, in aspect A, B, or C of the present invention, the terminal apparatus 1 may determine which of the first repetitive transmission and the second repetitive aggregation transmission is applied based on a PUSCH mapping type obtained based on the 'Time domain resource assignment' field included in the uplink grant.

Further, in aspect A, B, or C of the present invention, the terminal apparatus 1 may determine which of the first repetitive transmission and the second repetitive transmission is applied based on S and/or L indicated by the 'Time domain resource assignment' field included in the uplink grant.

In the uplink transmission of the present invention, the available symbols may be symbols at least indicated as flexible and/or uplink by higher parameters TDD-UL-DL-ConfigurationCommon and/or TDD-UL-DL-ConfigDedicated. That is, the available symbols are not symbols indicated as downlink by the higher parameters TDD-UL-DL-ConfigurationCommon and/or TDD-UL-DL-ConfigDedicated. The higher parameters TDD-UL-DL-ConfigurationCommon and/or TDD-UL-DL-ConfigDedicated are used to determine an uplink/downlink TDD configuration. Further, the available symbols are not symbols indicated as downlink by DCI format 2_0. Further, the available symbols are not symbols configured for transmission of a random access preamble. Further, the available symbols are not symbols configured for transmission of a sounding reference signal. In other words, the unavailable symbols may be symbols at least indicated as downlink by the higher parameters TDD-UL-DL-ConfigurationCommon and/or TDD-UL-DL-ConfigDedicated. The unavailable symbols may be symbols indicated as downlink by DCI format 2_0. The unavailable symbols may be symbols configured for transmission of a random access preamble. The unavailable symbols may be symbols configured for transmission of a sounding reference signal.

However, the available symbols are not symbols indicated at least by a higher layer parameter ssb-PositionsInBurst. ssb-PositionsInBurst is used to indicate a time domain position of an SS/PBCH block transmitted to the base station apparatus 3. That is, the terminal apparatus 1 knows by ssb-PositionsInBurst the position of the symbol with which the SS/PBCH block is transmitted. The symbol with which the SS/PBCH block is transmitted may be referred to as an SS/PBCH block symbol. That is, the available symbols are not SS/PBCH block symbols. That is, the unavailable symbols may be symbols with which the SS/PBCH block is transmitted.

However, the available symbols are not symbols at least indicated by pdcch-ConfigSIB1. That is, the available symbols are not symbols indicated by pdcch-ConfigSIB1 for a CORESET of Type0-PDCCH common search space set. pdcch-ConfigSIB1 may be included in MIB or ServingCellConfigCommon. That is, the unusable symbols may be symbols with which a CORESET of Type0-PDCCH common search space set is transmitted.

As a result, the terminal apparatus 1 can transmit uplink data to the base station apparatus 3.

Hereinafter, the configurations of apparatuses according to the present invention will be described.

Figure 23:
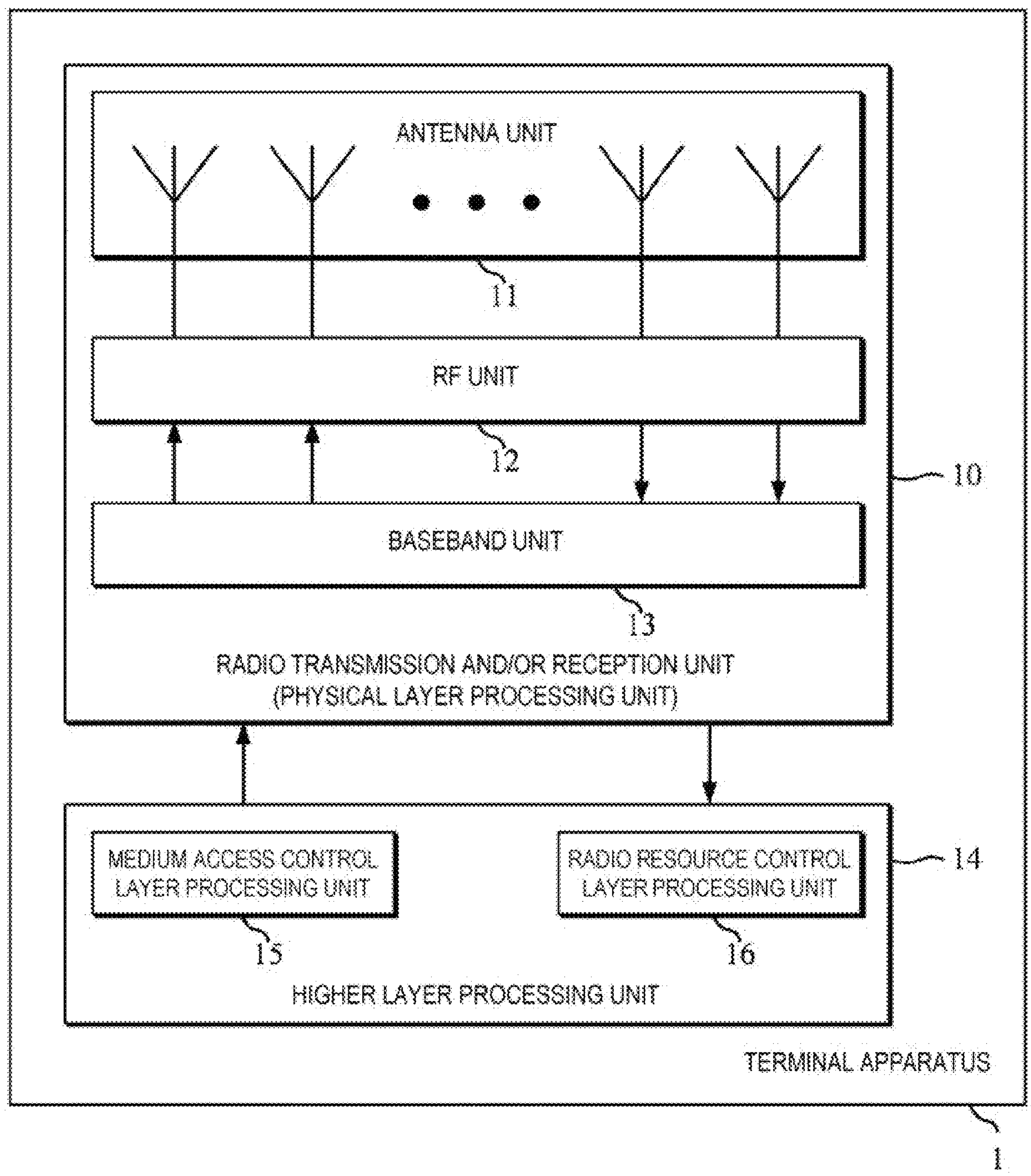
FIG. 23 is a schematic block diagram illustrating a configuration of a terminal apparatus according to an embodiment of the present invention.

FIG. 23 is a schematic block diagram illustrating a configuration of a terminal apparatus 1 according to an embodiment of the present invention. As shown in FIG. 23, the terminal apparatus 1 includes a radio transmission and/or reception unit 10 and a higher layer processing unit 14. The radio transmission and/or reception unit 10 includes an antenna unit 11, an RF (Radio Frequency) unit 12, and a baseband unit 13. The higher layer processing unit 14 includes a medium access control layer processing unit 15 and a radio resource control layer processing unit 16. The radio transmission and/or reception unit 10 is also referred to as a transmission unit, a reception unit, a monitoring unit, or a physical layer processing unit. The higher layer processing unit 14 is also referred to as a measurement unit 14, a selection unit 14, a determination unit 14, or a control unit 14.

The higher layer processing unit 14 outputs uplink data (which may be referred to as a transport block) generated by a user operation or the like to the radio transmission and/or reception unit 10. The higher layer processing unit 14 performs a part or all of processing of a medium access control (MAC) layer, a packet data convergence protocol (PDCP) layer, a radio link control (RLC) layer, and a radio resource control (RRC) layer. The higher layer processing unit 14 may have a function of determining a time resource for transmitting a physical uplink shared channel based on an upper layer signal and/or downlink control information received from the base station apparatus The medium access control layer processing unit 15 included in the higher layer processing unit 14 performs processing of the MAC layer (Medium Access Control layer). The medium access control layer processing unit 15 controls the transmission of a scheduling request based on various types of configuration information/parameters managed by the radio resource control layer processing unit 16.

The radio resource control layer processing unit 16 included in the higher layer processing unit 14 performs processing of the RRC layer (Radio Resource Control layer). The radio resource control layer processing unit 16 manages various types of configuration information/parameters of the present terminal apparatus. The radio resource control layer processing unit 16 sets various types of configuration information/parameters based on a higher layer signal received from the base station apparatus 3. That is, the radio resource control layer processing unit 16 configures the various types of configuration information/parameters based on information indicating the various types of configuration information/parameters received from the base station apparatus 3 (See FIG. 24). The radio resource control layer processing unit 16 controls (specifies) resource allocation based on downlink control information received from the base station apparatus 3.

The radio transmission and/or reception unit 10 performs processing of the physical layer, such as modulation, demodulation, encoding, decoding, and the like. The radio transmission and/or reception unit 10 demultiplexes, demodulates, and decodes a signal received from the base station apparatus 3 and outputs decoded information to the higher layer processing unit 14. The radio transmission and/or reception unit 10 generates a transmission signal by modulating and encoding data, and transmits the transmission signal to the base station apparatus 3 or the like. The radio transmission and/or reception unit 10 outputs a higher layer signal (RRC message), DCI, or the like received from the base station apparatus 3 to the higher layer processing unit 14. Further, the radio transmission and/or reception unit 10 generates and transmits an uplink signal (including a physical uplink control channel and/or a physical uplink shared channel) based on an instruction from the higher layer processing unit 14. The radio transmission and/or reception unit 10 may have a function of receiving a physical downlink control channel and/or a physical downlink shared channel. The radio transmission and/or reception unit 10 may have a function of transmitting a physical uplink control channel and/or a physical uplink shared channel. The radio transmission and/or reception unit 10 may have a function of receiving physical downlink control information by the physical downlink control channel. The radio transmission and/or reception unit 10 may have a function of outputting the downlink control information received by the physical downlink control channel to the higher layer processing unit 14.

The RF unit 12 converts (down-converts) a signal received via the antenna unit 11 into a baseband signal by quadrature demodulation, and then removes unnecessary frequency components. The RF unit 12 outputs a processed analog signal to the baseband unit.

The baseband unit 13 converts the analog signal input from the RE unit 12 into a digital signal. The baseband unit 13 removes a portion corresponding to a CP (Cyclic Prefix) from the converted digital signal, performs a fast Fourier transform (FFT) on the signal from which the CP has been removed, and extracts a signal in the frequency domain.

The baseband unit 13 generates an OFDM symbol by performing an inverse fast Fourier transform (IFFT) on data, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal to a signal with a carrier frequency, and transmits the up-converted signal via the antenna unit 11. Further, the RF unit 12 amplifies the power. Further, the RF unit 12 may have a function of determining the transmission power of uplink signals and/or uplink channels to be transmitted in a serving cell. The RF unit 12 is also referred to as a transmission power control unit.

Figure 24:
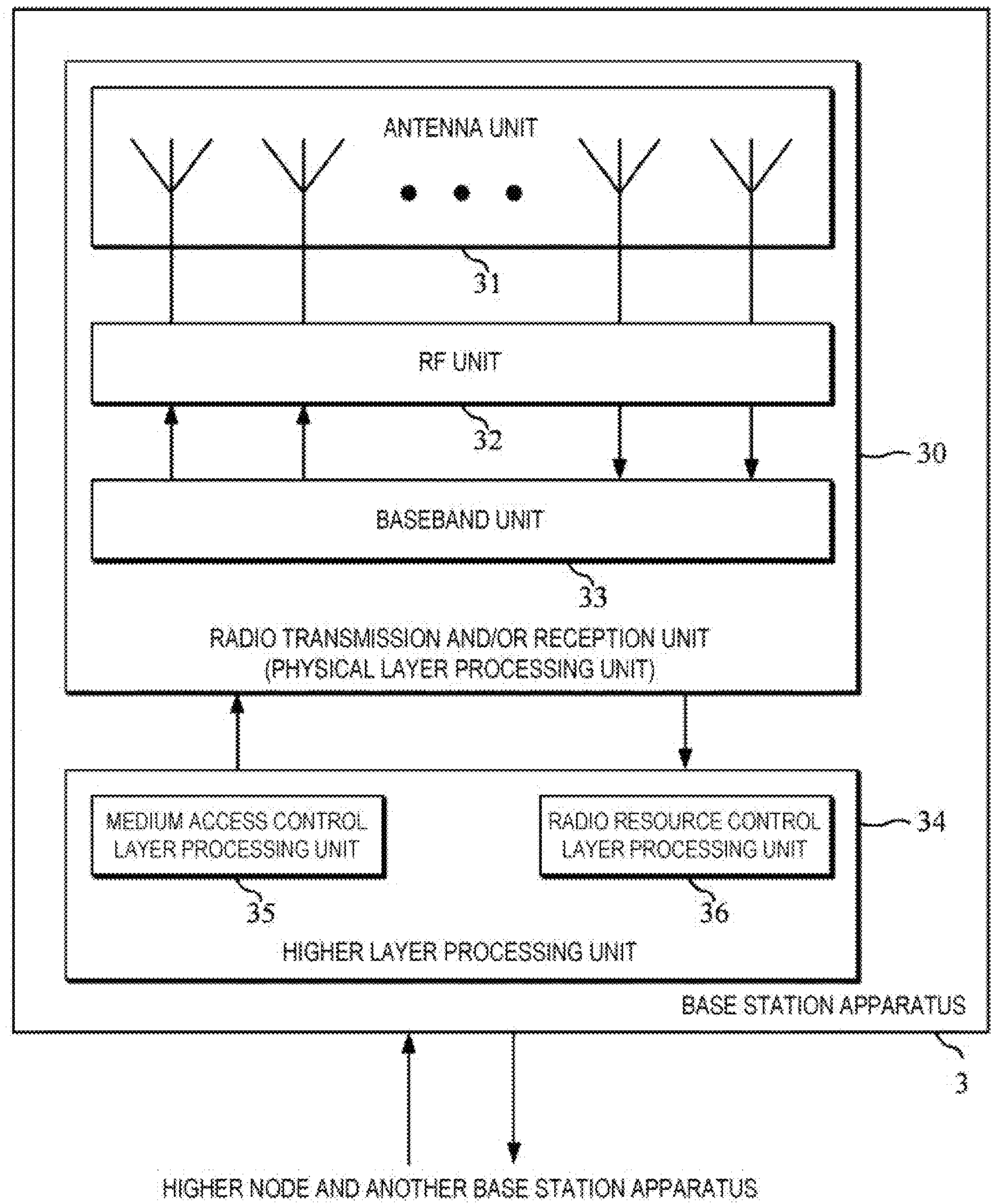
FIG. 24 is a schematic block diagram illustrating a configuration of a base station apparatus according to an embodiment of the present invention.

FIG. 24 is a schematic block diagram illustrating a configuration of a base station apparatus 3 according to an embodiment of the present invention. As shown in FIG. 24, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmission unit, a reception unit, a monitoring unit, or a physical layer processing unit. Further, a control unit that controls the operation of each unit based on various conditions may be provided additionally. The higher layer processing unit 34 is also referred to as a determination unit 34 or a control unit 34.

The higher layer processing unit 34 performs a part or all of processing of a medium access control (MAC) layer, a packet data convergence protocol (PDCP) layer, a radio link control (RLC) layer, and a radio resource control (RRC)

layer. The higher layer processing unit 34 may have a function of generating downlink control information based on a higher layer signal transmitted to the terminal apparatus 1 and a time resource for transmitting a physical uplink shared channel. The higher layer processing unit 34 may have a function of outputting the generated downlink control information or the like to the radio transmission and/or reception unit 30.

The medium access control layer processing unit 35 included in the higher layer processing unit 34 performs the processing of the MAC layer. The medium access control layer processing unit 35 performs processing associated with a scheduling request based on various types of configuration information/parameters managed by the radio resource control layer processing unit 36.

The radio resource control layer processing unit 36 included in the higher layer processing unit 34 performs processing of the RRC layer. The radio resource control layer processing unit 36 generates downlink control information (e.g., an uplink grant or a downlink grant) including resource allocation information for the terminal apparatus 1. The radio resource control layer processing unit 36 generates, or acquires from a higher node, downlink control information, downlink data (transport block or random access response) allocated on a physical downlink shared channel, system information, an RRC message, a MAC control element (CE), or the like, and outputs it to the radio transmission and/or reception unit 30. Further, the radio resource control layer processing unit 36 manages various types of configuration information/parameters of each terminal apparatus 1. The radio resource control layer processing unit 36 may set various types of configuration information/parameters for each terminal apparatus 1 via a higher layer signal. That is, the radio resource control layer processing unit 36 transmits/broadcasts information indicating various types of configuration information/parameters. The radio resource control layer processing unit 36 may transmit/broadcast information for identifying the configuration of one or more reference signals in a certain cell.

In a case that an RRC message, a MAC CE, and/or a PDCCH are transmitted from the base station apparatus 3 to the terminal apparatus 1 and the terminal apparatus 1 performs processing based on the reception of the above, the base station apparatus 3 performs processing (control of the terminal apparatus 1 and a system) by assuming that the terminal apparatus 1 performs the above processing. That is, the base station apparatus 3 transmits an RRC message, a MAC CE, and/or a PDCCH to the terminal apparatus 1 to cause the terminal apparatus 1 to perform processing based on the reception of the RRC message, the MAC CE, and/or the PDCCH.

The radio transmission and/or reception unit 30 transmits a higher layer signal (RRC message), DCI, or the like to the terminal apparatus 1. Further, the radio transmission and/or reception unit 30 receives an uplink signal transmitted from the terminal apparatus 1 based on an instruction from the higher layer processing unit 34. The radio transmission and/or reception unit 30 may have a function of transmitting a physical downlink control channel and/or a physical downlink shared channel. The radio transmission and/or reception unit 30 may have a function of receiving a physical uplink control channel and/or a physical uplink shared channel. The radio transmission and/or reception unit 30 may have a function of transmitting physical downlink control information by the physical downlink control channel. The radio transmission and/or reception unit 30 may have a function of transmitting by the physical downlink control channel the physical downlink control information outputted by the higher layer processing unit 34. Besides, since a part of functions of the radio transmission and/or reception unit 30 is the same as the functions of the radio transmission and/or reception unit 10, the description thereof is omitted. Further, when the base station apparatus 3 is connected to one or more transmission and/or reception points 4 (e.g., as shown in FIG. 1), a part or all of the functions of the radio transmission and/or reception unit 30 may be included in each transmission and/or reception point 4.

Further, the higher layer processing unit 34 transmits (forwards) or receives a control message or user data between the base station apparatuses 3 or between a higher level network apparatus (e.g., MME or S-GW (Serving-GW)) and the base station apparatus 3. In FIG. 24, other components of the base station apparatus 3 and transmission paths of data (control information) between the components are omitted, but it is clear that the base station apparatus 3 has a plurality of blocks having other functions as components necessary for operating as a base station apparatus. For example, the higher layer processing unit 34 includes a radio resource management layer processing unit or an application layer processing unit.

It should be noted that the "unit", which is also expressed by terms such as a section, a circuit, a constituent apparatus, an equipment, a member, and the like, in the figures is an element for implementing the functions and procedures of the terminal apparatus 1 and the base station apparatus 3.

Each of the units with reference numerals 10 to 16 included in the terminal apparatus 1 may be configured as a circuit. Each of the units with reference numerals 30 to 36 included in the base station apparatus 3 may be configured as a circuit.

(1) The terminal apparatus 1 according to the first aspect of the present invention includes: a reception unit 10 configured to receive an RRC message including first configuration information and receive downlink control information by a physical downlink control channel; a determination unit 14 configured to determine a time resource used for transmitting a physical uplink shared channel based on the first configuration information and a bit string indicated by a first field of the downlink control information; and a transmission unit 10 configured to use the time resource to perform one or more repetitive transmission of the physical uplink shared channel; wherein the first configuration information is information for configuring at least a starting symbol, a nominal transmission period, and a nominal number of repetitive transmissions of the time resource corresponding to an index indicated by the bit string.

(2) in the first aspect of the present invention, the higher layer processing unit 14 may determine an actual transmission period and/or an actual number of repetitive transmissions of the physical uplink shared channel to be transmitted by the repetitive transmissions from the starting symbol, the nominal transmission period, the nominal number of repetitive transmissions, a slot boundary, and/or arrangement of uplink symbols available for transmitting the physical uplink shared channel.

(3) The base station apparatus 3 according to the second aspect of the present invention includes: a radio transmission and/or reception unit 30 configured to transmit an RRC message including first configuration information and transmit downlink control information by a physical downlink control channel; a determination unit 34 configured to determine a bit string indicated by a first field of the downlink control information based on a time resource used for receiving a physical uplink shared channel; and a radio transmission and/or reception unit 30 configured to receive with the time resource one or more repetitive transmissions of the physical uplink shared channel; wherein the first configuration information is information for configuring a starting symbol, a nominal transmission period, and a nominal number of repetitive transmissions of the time resource corresponding to at least an index indicated by the bit string.

Accordingly, the terminal apparatus 1 can efficiently communicate with the base station apparatus 3. For example, in a DCI that schedules data for different services (eMBB, URLLC and/or mMTC, etc.), an appropriate notification method can be used for each service in indicating a time resource to receive a PDSCH and/or a time resource to transmit a PUSCH. Further, the base station apparatus 3 can efficiently communicate with the terminal apparatus 1. For example, in a DCI that schedules data for different services (eMBB, URLLC and/or mMTC, etc.), an appropriate notification method can be used for each service in indicating a time resource to transmit a PDSCH and/or a time resource to receive a PUSCH.

The program operating in the apparatuses according to the present invention may be a program that controls a central processing unit (CPU) to operate a computer so as to implement the functions of the embodiment according to the present invention. Programs or information processed by the programs are temporarily stored in a volatile memory such as a random access memory (RAM), a non-volatile memory such as a flash memory, a hard disk drive (HDD), or other storage device system.

Besides, a program for implementing such functions of the embodiment according to the present invention may be recorded on a computer-readable recording medium. It may be implemented by loading the program recorded on the recording medium into a computer system and executing the program. Here, the "computer system" described herein refers to a computer system built into the apparatus and includes an operating system or hardware components such as peripheral devices. Further, the "computer-readable recording medium" may be any of a semiconductor recording medium, an optical recording medium, a magnetic recording medium, a medium dynamically retaining the program for a short time, or any other computer readable recording medium.

In addition, the various functional blocks or various features of the devices used in the described embodiments may be installed or performed by an electrical circuit, such as an integrated circuit or multiple integrated circuits. Circuits designed to execute the functions described in the present description may include general-purpose processors, digital signal processors (DSPs), application specific integrated circuits (ASICs), field programmable gate arrays (FPGAs) or other programmable logic devices, discrete gates or transistor logic, discrete hardware components, or any combination of the above. The general-purpose processor may be a microprocessor or may be a conventional processor, controller, microcontroller, or state machine. The above-mentioned electric circuit may include a digital circuit or may include an analog circuit. Further, in a case that with advances in semiconductor technology, a new circuit integration technology may appear to replace the present technology for integrated circuits, one or more aspects of the present invention may also use a new integrated circuit based on the new circuit integration technology.

Besides, in the embodiment according to the present invention, an example applied to a communication system, which includes a base station apparatus and a terminal apparatus, has been described, but it can also be applied to a system in which terminals communicate with each other via D2D (Device to Device) communication.

Besides, the present invention is not limited to the above-described embodiments. In the embodiments, apparatuses have been described as an example, but the invention of the present application is not limited to these apparatuses and is applicable to a terminal apparatus, a communication apparatus, or a fixed-type or a stationary-type electronic apparatus installed indoors or outdoors, for example, an AV apparatus, a kitchen apparatus, a cleaning or washing machine, an air-conditioning apparatus, office equipment, a vending machine, other household apparatuses, or the like.

The embodiments of the present invention have been described in detail with reference to the accompanying drawings, but the specific configuration is not limited to the present invention, but also includes design changes and the like without departing from the scope of the present invention. Further, various modifications are possible within the scope of the present invention defined by claims, and embodiments that are made by suitably combining technical means disclosed according to the different embodiments are also included in the technical scope of the present invention. Furthermore, configurations in which the elements having the same effect, as described in each of the above embodiments, are replaced with each other are also included in the technical scope of the present invention.

What is claimed is:

1. A terminal apparatus, comprising:

a reception unit configured to receive (i) a radio resource control (RRC) message including first configuration information and (ii) downlink control information including a first field via a physical downlink control channel (PDCCH);

a transmission unit configured to perform one or more repetitive transmissions of a physical uplink shared channel (PUSCH) based on the first configuration information and the first field, wherein the first configuration information is for configuring at least one of a starting symbol of a time resource corresponding to an index indicated by the first field, a number of symbols allocated to the PUSCH corresponding to the index, and a nominal number of repetitive transmissions corresponding to the index; and a determination unit configured to determine a symbol to be used for each of the one or more repetitive transmissions of the PUSCH based on the starting symbol, the number of symbols allocated to the PUSCH, the nominal number of repetitive transmissions, a slot boundary, and one or more uplink symbols available for transmitting the PUSCH, wherein:

the number of the one or more uplink symbols available for transmitting the PUSCH is different from the number of symbols allocated to the PUSCH corresponding to the index, and the one or more repetitive transmissions of the PUSCH include a symbol that is unavailable for transmitting the PUSCH.

2. A base station apparatus, comprising:

a transmission unit configured to transmit, to a terminal apparatus, (i) a radio resource control (RRC) message including first configuration information and (ii) downlink control information including a first field via a physical downlink control channel (PDCCH); and a reception unit configured to receive one or more repetitive transmissions of a physical uplink shared channel (PUSCH) based on the first configuration information and the first field, wherein:

the first configuration information is for configuring at least one of a starting symbol of a time resource corresponding to an index indicated by the first field, a number of symbols allocated to the PUSCH corresponding to the index, and a nominal number of repetitive transmissions corresponding to the index, a symbol to be used for each of the one or more repetitive transmissions of the PUSCH is determined by the terminal apparatus based on the starting symbol, the number of symbols allocated to the PUSCH, the nominal number of repetitive transmissions, a slot boundary, and one or more uplink symbols available for transmitting the PUSCH, the number of the one or more uplink symbols available for transmitting the PUSCH is different from the number of symbols allocated to the PUSCH corresponding to the index, and the one or more repetitive transmissions of the PUSCH include a symbol that is unavailable for transmitting the PUSCH.

3. A communication method for a terminal apparatus, comprising:

receiving (i) a radio resource control (RRC) message including first configuration information and (ii) downlink control information including a first field via a physical downlink control channel (PDCCH);

performing one or more repetitive transmissions of a physical uplink shared channel (PUSCH) based on the first configuration information and the first field, wherein the first configuration information is for configuring at least one of a starting symbol of a time resource corresponding to an index indicated by the first field, a number of symbols allocated to the PUSCH corresponding to the index, and a nominal number of repetitive transmissions corresponding to the index; and determining a symbol to be used for each of the one or more repetitive transmissions of the PUSCH based on the starting symbol, the number of symbols allocated to the PUSCH, the nominal number of repetitive transmissions, a slot boundary, and one or more uplink symbols available for transmitting the PUSCH, wherein:

the number of the one or more uplink symbols available for transmitting the PUSCH is different from the number of symbols allocated to the PUSCH corresponding to the index, and the one or more repetitive transmissions of the PUSCH include a symbol that is unavailable for transmitting the PUSCH.

* * * * *

UNITED STATES PATENT AND TRADEMARK OFFICE
CERTIFICATE OF CORRECTION

| | | |
|---|---|---|
| PATENT NO. | : 12,156,230 B2 | Page 1 of 1 |
| APPLICATION NO. | : 17/599720 | |
| DATED | : November 26, 2024 | |
| INVENTOR(S) | : Hiroki Takahashi et al. | |

It is certified that error appears in the above-identified patent and that said Letters Patent is hereby corrected as shown below:

On the Title Page

Please replace item (71) with the following:
(71) SHARP KABUSHIKI KAISHA, Sakai (JP)

Signed and Sealed this
Fourth Day of February, 2025

Coke Morgan Stewart
*Acting Director of the United States Patent and Trademark Office*